(12) United States Patent
Vaughn

(10) Patent No.: US 11,731,059 B2
(45) Date of Patent: Aug. 22, 2023

(54) VISUALLY DISTINGUISHABLE ROBOTS AND METHODS TO MANUFACTURE THE SAME

(71) Applicant: Intel Corporation, Santa Clara, CA (US)

(72) Inventor: Robert Vaughn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 15/937,536

(22) Filed: Mar. 27, 2018

(65) Prior Publication Data

US 2019/0046890 A1 Feb. 14, 2019

(51) Int. Cl.
| | | |
|---|---|---|
| *A63H 3/48* | (2006.01) | |
| *A63H 3/40* | (2006.01) | |
| *A63H 3/36* | (2006.01) | |
| *A63H 9/00* | (2006.01) | |
| *B25J 11/00* | (2006.01) | |

(52) U.S. Cl.
CPC .............. *A63H 3/48* (2013.01); *A63H 3/36* (2013.01); *A63H 3/365* (2013.01); *A63H 3/40* (2013.01); *A63H 9/00* (2013.01); *B25J 11/0015* (2013.01); *Y10S 901/47* (2013.01)

(58) Field of Classification Search
CPC . A63H 3/48; A63H 3/36; A63H 3/365; A63H 2200/00; A63H 33/14; A63H 9/00; B25J 11/0015
See application file for complete search history.

(56) References Cited

U.S. PATENT DOCUMENTS

| | | | | |
|---|---|---|---|---|
| 3,355,837 A | * | 12/1967 | Pedersen | A63H 33/12 411/436 |
| 4,961,716 A | * | 10/1990 | Hippely | A63H 33/3044 414/917 |
| 5,090,910 A | * | 2/1992 | Narlo | G09B 19/0076 434/377 |

(Continued)

FOREIGN PATENT DOCUMENTS

| | | | | | |
|---|---|---|---|---|---|
| FR | 2624394 A | * | 6/1989 | | |
| FR | 2624394 A | * | 6/1989 | | A63H 3/365 |

(Continued)

OTHER PUBLICATIONS

Dunne et al., "Like Mother, like daughter: Face scanning technology reveals the features you're most likely to inherit from your parents," dated Apr. 19, 2017, retrieved from [http://www.dailymail.co.uk/sciencetech/article-4424200/Face-map-shows-features-likely-inherit.html?printingPage=true] on Mar. 7, 2018, 14 pages.

(Continued)

*Primary Examiner* — Eugene L Kim
*Assistant Examiner* — Alyssa M Hylinski
(74) *Attorney, Agent, or Firm* — Hanley, Flight & Zimmerman, LLC

(57) ABSTRACT

Visually distinguishable robots and methods to manufacture the same are disclosed. An example kit for constructing a robot includes a first component for a framework of the robot, a second component for the framework, and a connector to secure the first and second components in a spatial relationship of a plurality of possible spatial relationships. The spatial relationship is to cause the robot to have a humanly perceptible identity.

28 Claims, 10 Drawing Sheets

(56) References Cited

U.S. PATENT DOCUMENTS

| | | | |
|---|---|---|---|
| 6,036,082 A * | 3/2000 | Caldarone | B23K 37/0452 228/44.3 |
| 6,068,543 A * | 5/2000 | Renn | B44B 3/001 408/110 |
| 6,146,721 A * | 11/2000 | Freynet | A63H 3/365 446/236 |
| 6,772,932 B1 * | 8/2004 | Halstead | B23K 37/0235 901/42 |
| 7,967,656 B2 * | 6/2011 | Hu | A63H 33/10 446/124 |
| 8,594,839 B2 * | 11/2013 | Hanson | G06N 3/008 700/258 |
| 9,592,455 B2 * | 3/2017 | Tiefel | A63H 3/20 |
| 10,311,755 B2 * | 6/2019 | Kenderes | G02C 13/003 |
| 2005/0078816 A1 * | 4/2005 | Sekiguchi | A63H 3/28 379/419 |
| 2008/0220689 A1 * | 9/2008 | Mimlitch | A63H 33/12 446/91 |
| 2009/0098798 A1 * | 4/2009 | Wang | A63H 11/00 446/337 |
| 2009/0247045 A1 * | 10/2009 | Pettey | A63H 33/107 446/484 |
| 2011/0041641 A1 * | 2/2011 | Bennett | A63H 3/04 74/490.08 |
| 2013/0061709 A1 * | 3/2013 | Kim | B25J 19/0016 74/490.05 |
| 2013/0288565 A1 * | 10/2013 | McMullen | A63H 3/365 446/321 |
| 2014/0256210 A1 * | 9/2014 | Johnson | A63H 33/046 446/108 |
| 2016/0051903 A1 * | 2/2016 | Nilsson | A63H 33/10 446/108 |
| 2016/0151909 A1 * | 6/2016 | Hardouin | B25J 9/08 700/245 |
| 2016/0354705 A1 * | 12/2016 | Poulus | A63H 33/04 |
| 2016/0375371 A1 * | 12/2016 | Slepov | A63H 33/12 446/85 |
| 2018/0353872 A1 * | 12/2018 | Xia | E04H 1/1205 |
| 2019/0105783 A1 * | 4/2019 | Al Moubayed | B25J 11/0015 |

FOREIGN PATENT DOCUMENTS

| | | | | |
|---|---|---|---|---|
| KR | 20170053185 A | * | 5/2017 | |
| WO | WO-2016126656 A1 | * | 8/2016 | G02C 13/003 |
| WO | WO-2017008110 A1 | * | 1/2017 | A63H 33/06 |

OTHER PUBLICATIONS

Orwig, "More Than 7 Billion People Populate Earth and Each One Has A Unique Face—Here's Why," dated Sep. 23, 2014, retrieved from [http://www.businessinsider.com/why-are-human-faces-so-complex-and-unique-2014-9] on Mar. 7, 2018, 3 pages.

Ostrofsky et al., "Objective Versus Subjective Measures of Face-Drawing Accuracy and Their Relations with Perceptual Constancies," Psychology of Aesthetics, Creativity, and the Arts, Aug. 11, 2014, vol. 8, No. 4, 486-497, 13 pages.

Wikipedia, "Mendelian inheritance," retrieved from [https://en.wikipedia.org/wiki/Mendelian_inheritance] on Mar. 7, 2018, last edited Mar. 4, 2018, 7 pages.

* cited by examiner

US 11,731,059 B2

VISUALLY DISTINGUISHABLE ROBOTS AND METHODS TO MANUFACTURE THE SAME

FIELD OF THE DISCLOSURE

This disclosure relates generally to robotics, and, more particularly, to visually distinguishable robots and methods to manufacture the same.

BACKGROUND

Advancements in robotics technologies have given rise to robots that appear and are capable of acting more and more like humans. Furthermore, the proliferation of such technologies has resulted in robots being commercialized for private use by consumers. As these trends continue, it is likely that an increasing portion of all members of society will own, use, or otherwise interact with robots.

BRIEF DESCRIPTION OF THE DRAWINGS

In general, the same reference numbers will be used throughout the drawing(s) and accompanying written description to refer to the same or like parts.

DETAILED DESCRIPTION

As technology advances, it is likely that robots will be used in public places to assist owners of such robots in performing one or more suitable task(s) (e.g., going to a store to purchase items, escorting children to or from school, etc.). As robots become more common and a greater number of consumers own, use, and/or interact with such robots, it may become difficult for people to recognize or distinguish one robot from another. For example, if multiple robots are sent to a school to pick up different children, the children may not be able to readily identify which robot belongs to them unless the different robots are visually distinguishable. Accordingly, there is a need to individualize robots for easy recognition by humans.

Robots may be individualized based on a unique design made from customized parts. However, manufacturing customized robots in this manner is expensive and not conducive to high volume manufacturing. Similarly designed robots may be uniquely identifiable by a visual inspection based on some form of marker or indicator positioned on such robots (e.g., a unique serial number, name, image, etc. printed on a surface of the robot or displayed via a screen on the robot). While such markers would enable one robot to be distinguished from another, the markers may require a person to be relatively close to the robot to see the marker, thus, limiting the ability of a human being to recognize such robots with a simple glance from a relative distance. Furthermore, such markers may detract from the appearance of the robots, particularly if made relatively large to be seen from a distance. Further still, markers may not be reliable because they are susceptible to being copied for duplication on a different robot and/or modified for obfuscation of the identity of the correct robot.

Examples disclosed herein overcome the above challenges by enabling the mass production of robots that have features that are visually recognizable to a human and that would be difficult to copy and/or modify. Example robots disclosed herein may be assembled using the same components, thereby enabling high volume production of the robots. However, the unique visual appearance of individual robots is achieved based on variations in how the components are positioned and/or oriented relative to one another when assembled, thereby giving two different robots different appearances that enable a human to visually distinguish one of the two robots from the other.

Figure 1:
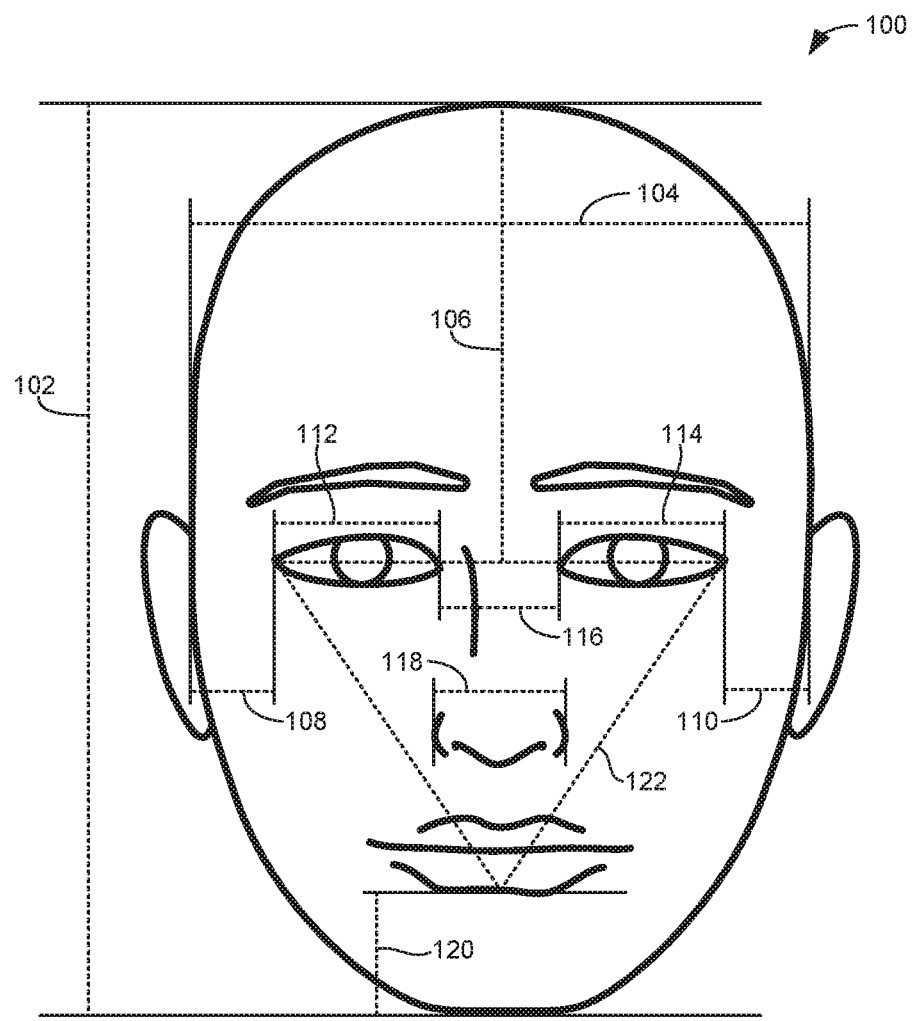
FIG. 1 illustrates a human head and various anatomical features that contribute to the ability of humans to distinguish one person from another.

Some example robots disclosed herein are humanoid robots. In some such examples, manufacturing visually distinguishable features in accordance with teachings disclosed herein takes advantage of humans' innate capacity to distinguish between different people based on relatively minor variations in facial and/or other anatomical features. Research has shown that some of the greatest variability in the physical appearance of humans is in the size and spatial relationship of certain facial features. This variability enables humans to recognize the identity of others and to distinguish one person from another. By way of example, FIG. 1 illustrates a human head 100 and various facial and other anatomical features that may vary from person to person to enable humans to distinguish one person from another. As shown in the illustrated example, the features that may vary from one person to another include a head height 102, a head width 104, a vertical position of the eyes 106, a horizontal position of each eye 108, 110, a width of each eye 112, 114, an interocular distance 116, a width of the nose 118, a vertical position of the mouth 120, and a triangle 122 defined by the eyes and mouth. Some studies suggest that the area of greatest variability between different people (and, thus, a significant factor in enabling the recognition of individuals) corresponds to the area defined by the triangle 122. The features shown in FIG. 1 are provided by way of example. There are many other features and/or measurements that can contribute to people's ability to recognize and/or distinguish one person from another. Furthermore, the ability to recognize a person is not limited to features on a person's face or head but extends to many anatomical features through the body (e.g., height, arm length, leg length, finger length, body shape, posture, gait, etc.).

Figure 2:
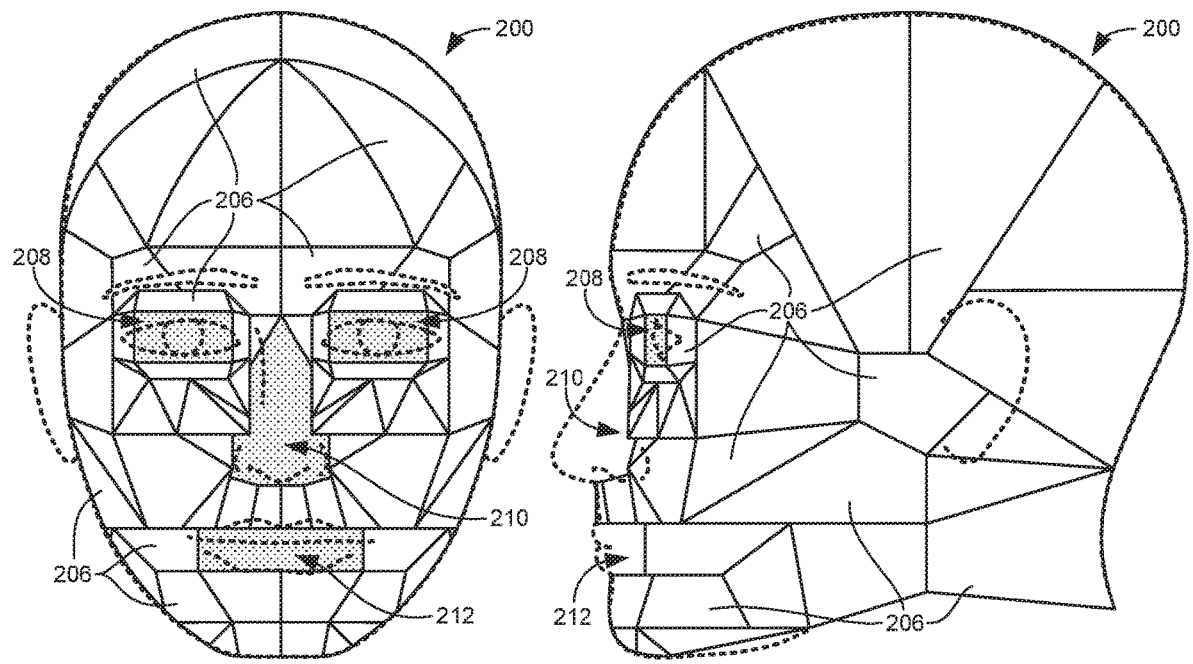
FIG. 2 is a front view and a profile view of an example framework of a robotic head constructed in accordance with teachings disclosed herein.

FIG. 2 is a front view (on the left) and a profile view (on the right) of an example structural framework or housing 200 (e.g., a skull) for a robotic head constructed in accordance with teachings disclosed herein that may enclose one or more motors, actuators, processors, and/or other electromechanical components of the robot. For purposes of explanation, the head 100 of FIG. 1 is reproduced in dashed lines over the framework 200 in FIG. 2. The example 200 framework may enclose one or more electrical, mechanical, and/or electromechanical devices (e.g., processors, motors, sensors, etc.). As shown in the illustrated example, the framework 200 is made of a plurality of plates, panels, or other structural components 206. In some examples, the framework 200 includes a first set of openings 208 at the location of the eyes, a second opening 210 at the location of the nose, and a third opening 212 at a location of the mouth. For purposes of explanation, the first, second, and third openings 208, 210, 212 in FIG. 1 are shaded in to indicate these regions are not closed off with the structural components 206 defining the rest of the structure of the framework 200.

The lines demarcating the shape of each of the different components 206 in FIG. 2 (and the corresponding openings 208, 210, 212) are for illustration only and not necessarily indicative of the actual shape of the components used to manufacture the structural framework 200 of a robotic head. That is, teachings disclosed herein include components with different shapes other than those shown in the illustrated example of FIG. 2. As mentioned above, the region of greatest variability of physical features on a human is in the triangular area defined by the eyes, nose, and mouth. Accordingly, in some examples, there are a greater number of components 206 in this region (e.g., the front of the face) that are smaller in size than the components 206 used to form other regions of the framework 200 (e.g., the back of the head).

Figure 3:
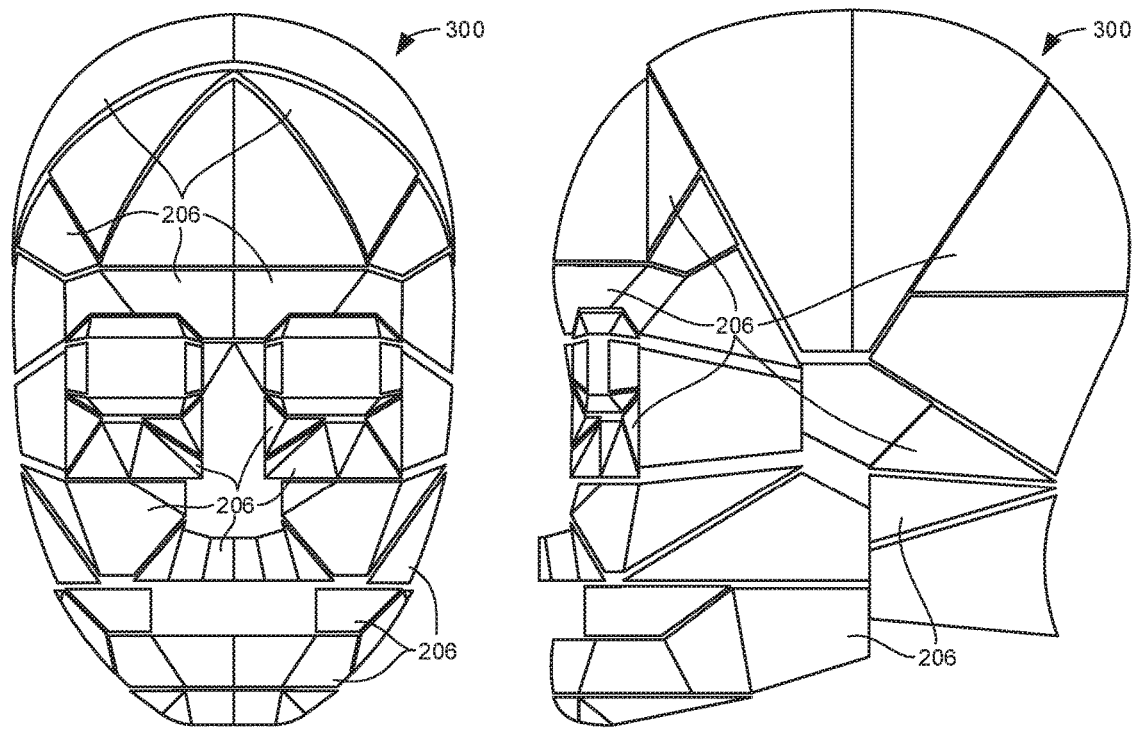
FIG. 3 is a front view and a profile view of another example framework of a robotic head constructed using the same components as the example framework of FIG. 2.

As described more fully below, the shape of the structural framework 200, and thus, the appearance of the resulting robot head, may be altered by changing the spatial relationship of different ones of the components 206. For example, FIG. 3 is a front view (on the left) and a profile view (on the right) of another example structural framework 300 of a different robotic head constructed using the same components 206 as the example framework 200 of FIG. 2. That is, the components 206 used in the framework 300 of FIG. 3 have the same design, shape, and structure as the components 206 used in the framework 200 of FIG. 2. Although the same components 206 are used to form the structural frameworks 200, 300 for both of the robotic heads of FIG. 2 and FIG. 3, the components 206 in the framework 300 of FIG. 3 are spaced farther apart in the vertical direction than the components in the framework 200 of FIG. 2. As a result, the structural framework 300 of FIG. 3 has a greater height than the framework 200 of FIG. 2 resulting in a taller or longer face for the robotic head associated with the framework 300 of FIG. 3. By spacing and/or orienting individual ones of the components 206 in different directions in this manner, robotic heads with different shapes and/or with specific features having different shapes can be achieved without the need for customized parts.

An example manner in which the components 206 may be secured in a particular spatial relationship to achieve different visual appearances is described in connection with FIGS. 4-6, which illustrate four example structural components 206 in different spatial relationships. In the illustrated example of FIG. 4, the structural components 206 are secured to one another by a plurality of connectors 402. The connectors 402 implement means for coupling adjacent ones of the structural components. The connectors 402 may include, for example, pressed fittings, threaded fasteners, adhesives, polymer attachments, spot welds, etc. In some examples, the connectors 402 include small strips of material that overlap adjacent components 206 that are separately affixed to each component (e.g., via threaded fasteners, adhesives, welding, etc.). In some examples, the connectors 402 may be flexible to allow some relative motion between the components they connect (e.g., two or more components 206). In other examples, the connectors 402 may be rigid to hold the connected components in a substantially fixed relationship relative to one another. While two connectors 402 are shown connecting any two of the adjacent components 206, in some examples, more or fewer connectors 402 (e.g., 0, 1, 2, 3, etc.) may be used between specific pairs of the components.

Figure 4:
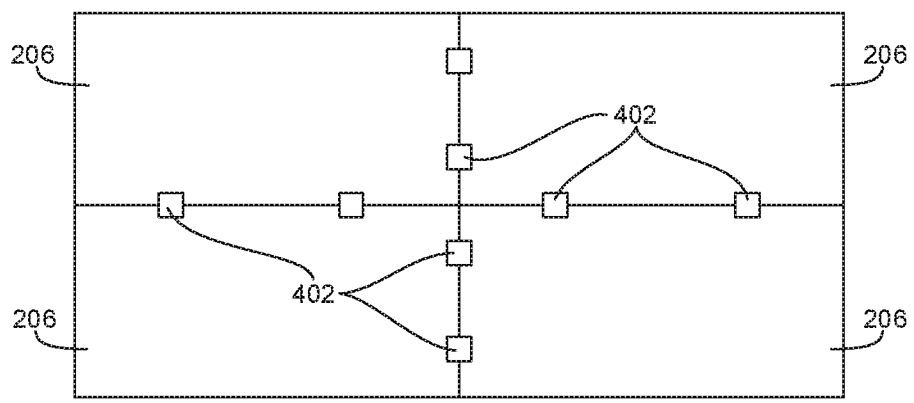
FIGS. 4-6 illustrate example components of the example framework of FIGS. 2 and 3 connected in accordance with teachings disclosed herein.

In the example of FIG. 4, the components 206 are assembled substantially flush and relatively close to one another. By contrast, in FIG. 5, the components 206 are assembled spaced farther apart and partially rotated relative to one another. The illustrated examples of FIGS. 4 and 5 show the components 206 in a single plane. However, any one of the components 206 may be translated in any direction in three-dimensional space relative to any other component. Likewise, any one of the components 206 may be rotated about any axis in three-dimensional space relative to any other component.

The spatial relationship between different structural components 206 may be defined in a number of ways. In some examples, the spatial relationships between different components 206 are defined based on end state modeling in which an overall design or end state for a robot is defined or modelled using a computer and then the spatial relationships for each component to be assembled is selected to fit the model. In some examples, the end state model is defined based on specified measurements corresponding to anatomical features such as, for example, those identified in FIG. 1, ratios between two or more of the features identified in FIG. 1, and/or any other suitable measurement. In some examples, the specified measurements for the anatomical features are limited to a range of variability of the anatomical feature as observed in nature. For example, the average interpupillary distance among adults (an anatomical feature defined as the distance from the center of one pupil to the center of the other pupil) is approximately 62 mm with variability (between the $1^{st}$ and $99^{th}$ percentile of individuals) ranging from approximately 53 to 73 mm. Thus, a particular measurement specified for a modelled design of a robot corresponding to the interpupillary distance may be limited to the range of 53 to 73 mm. In other examples, the range of variability may be defined to a percentile of the population that is wider or narrower than in the above example and/or defined in any other suitable manner (e.g., based on the number of standard deviations from the mean). Limiting specified measurements for various features of a robot that correspond to anatomical features of a human in this manner will ensure that the robot is likely to generally mimic the appearance of humans. In other examples, the range of variability may be defined independent of measurements observed in nature.

It may be impractical to specifically provide the measurements for each feature defining a robot with a unique appearance (e.g., an appearance enabling human perceptible identification of the robot from other robots), particularly when the robot is one of many unique robots being mass produced. Accordingly, in some examples, the specified measurements for the features of any particular robot may be automatically selected from within the limited ranges defined for the corresponding feature(s) in a random or pseudo-random manner. That is, for a new robot to be manufactured, a measurement for one or more of the feature(s) affecting the visual appearance (e.g., recognizability to a human) of the robot are randomly or pseudo-randomly selected from within the limited range(s) of variability defined for the feature(s). Once the specified measurement for each feature has been defined, the spatial relationships between separate ones of the components 206 used to assembly the robot may be calculated to produce the end state model of the robot. Multiple robots assembled following this process are likely to have humanly recognizable differences in appearance because the measurements for the features of the end state model (and thus the spatial relationships between the individual components) are randomly or pseudo-randomly selected. As such, it is possible to mass produce robots that have distinct visual appearances even though the underlying components used in each robot have generally the same design, shape, structure and components.

In some examples, randomness or pseudo-randomness in the spatial relationships between structural components of a robot (to produce robots with distinct visual appearances) is generated without direct reference to an end state model. That is, in some examples, the spatial relationships between any two particular components may be randomly or pseudo-randomly selected within a defined range of available variability in the relative position of the two components. For example, the range of available variability between two components may specify that the distance between two components may range from 0 mm (when the components are abutting) to some upper limit (e.g., 3 mm, 5 mm, 10 mm, etc.). In some examples, separate ranges are defined for the distance between two components and for the angular or rotational offset between the two components. In some examples, separate ranges are defined for each degree of freedom between the two components (e.g., translation (distance) along each axis in three-dimensional space, and rotation about each axis in three-dimensional space). The range(s) of available variability defined for one pair of components may be different than the range of available variability for a different pair of components.

In some examples, the range of available variability for a spatial relationship between two components may be conditioned on the spatial relationship of other components. For example, a range of variability may define a distance between first and second components as ranging from 0 to 10 mm on the condition that the distance is not more than 3 mm different than the distance between third and fourth components. Thus, if the third and fourth components are abutting one another (a distance of 0 mm), the available distance range for the first and second components is limited to the range of 0 to 3 mm. By contrast, if the third and fourth components are spaced 8 mm apart, the available distance range for the first and second components is limited to the range of 5 to 10 mm. In some examples, the particular parameters defining the range of available variability for a spatial relationship between different components are based on a range of variability of an anatomical feature observed in nature as described above.

Randomly or pseudo-randomly selecting the values for spatial relationships between different components for manufactured robots, as outlined above, will result in visually unique robots when the components are assembled. Thus, visually distinguishable robots may be generated even though the robots are assembled using the same components having the same design, shape, and structure.

Figure 5:
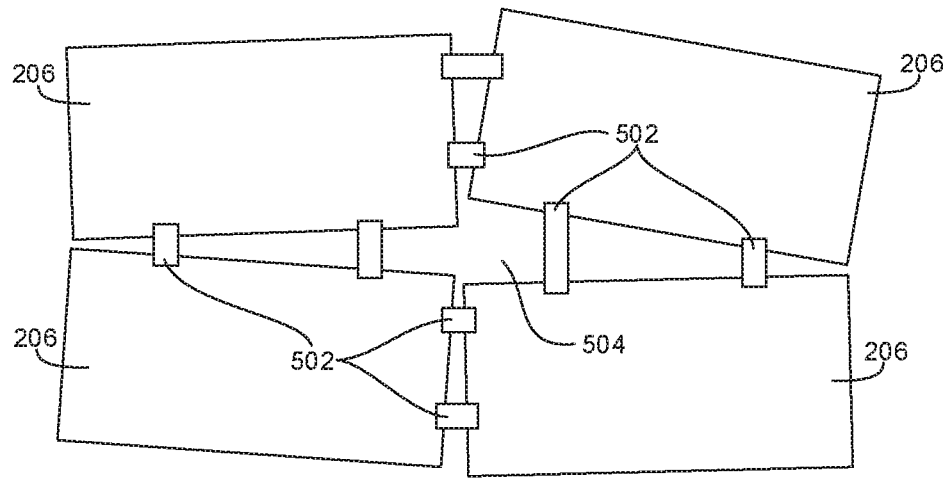

In some examples, the spatial relationships between two or more of the individual components 206 may produce gaps 504 between the components as shown in FIG. 5. In some such examples, connectors 502 span the gaps 504 to secure the adjacent components 206. In the illustrated examples, the connectors 502 of FIG. 5 are substantially the same as the connectors 402 of FIG. 4 described above except that they are larger (e.g., longer) or otherwise adapted to extend across the gaps 504. As such, although most of the components (e.g., the components 206) used to assembly robots are the same, in some examples, different connectors 402, 502 are used in order to provide different spatial relationships between the same components 206 to create different visual effects. Thus, for example, two different robots may include all of the same components 206, but different sets of connectors 402, 502. Also, other aspects of the robots may be identical in some examples (e.g., internal electrical, mechanical, and/or electromechanical components).

Figure 6:
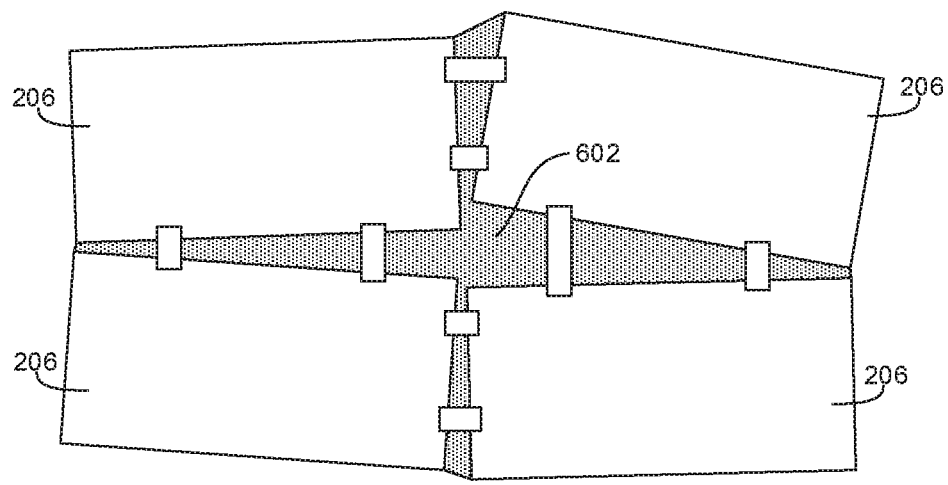

In some examples, once the components 206 are secured to one another by the connectors 502 as shown in FIG. 5, a structural filler material 602 (e.g., a structural foam glue) may be applied, as shown in FIG. 6, to fill in the gaps 504 and provide structural reinforcement to the overall framework. In some examples, the structural filler material 602 may be applied over the top(s) of the connectors 402 and/or the components 206 to smooth out the outer surface and/or to fill in discontinuities between components that are positioned at angles relative to one another. Additionally or alternatively, synthetic skin and/or other flexible material (e.g., polymer-based synthetic muscle tissue) may cover the framework and, thus, smooth out discontinuities. In some such examples, the flexible nature of such materials enables the material to deform around the underlying components 206 so that the shape of the framework defined by the spatial relationship of the components is still humanly perceptible even though covered by the material. In other examples, artificial muscles and/or skin may be omitted such that the components 206 remain visible once manufacturing of the robot is complete.

Figure 7:
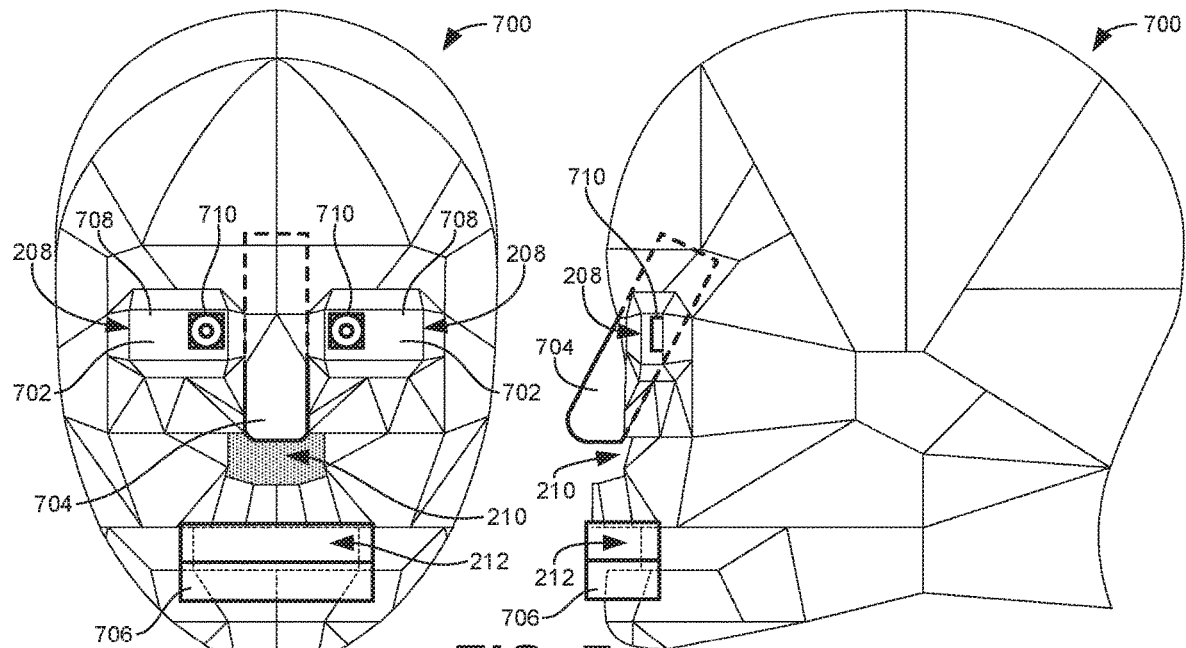
FIG. 7 is a front view and a profile view of the example framework of FIG. 2 with example eyes, nose, and mouth assemblies connected to the framework in an example arrangement.

FIGS. 2-6 illustrate the construction of an underlying framework (or skull) for a head of a robot. By adjusting the spatial relationships between two or more of the individual components 206, the shape and/or size of the framework may be varied from one robot to another. Further, the variability in the spatial relationships of the components 206 may result in some variation in the size and/or position of the first, second, and third openings 208, 210, 212 shown in FIG. 2 to receive respective eye assemblies 702, a nose assembly 704, and a mouth assembly 706 as shown in FIGS. 7 and 8.

In some examples, the eye assemblies 702, the nose assembly 704, and the mouth assembly 706 may be adjusted relative to the framework 200 of the robotic head. In particular, the eye assemblies 702 may include a base portion 708 that supports an image sensor 710. As shown by comparison between FIGS. 7 and 8, the image sensor 710 may be vertically and/or horizontally offset relative to the base portion 708 of the respective eye assembly 702. Thus, as shown in the illustrated example of FIG. 7, the image sensor 710 associated with each eye assembly 702 is located at the inner upper corner of the base portion 708. By contrast, the image sensor 710 associated with each eye assembly 702 shown in FIG. 8 is located at the outer lower corner of the base portion 708. As a result, even though the first openings 208 are the same in both FIGS. 7 and 8, considerable variability in the spacing of the image sensors 710 is possible. In some examples, the vertical and horizontal offset of the image sensors 710 relative to their respective base portions 708 are randomly or pseudo-randomly selected for each robot that is manufactured, thereby further contributing to the distinctness of each robot while using the same components for each robot (e.g., the same eye assemblies 702). In some examples, the position of the image sensors 710 may be mechanically and/or programmatically fixed at the time of manufacture (e.g., when the eye assemblies 702 are installed in the first openings 208). In other examples, a robot may have the ability to self-position the image sensors 710 after the robot is manufactured.

A single nose assembly 704 may be structured to produce noses with different lengths. For example, the nose assembly may be positioned to give the appearance of a short nose, as shown in FIG. 7, or a long nose, as shown in FIG. 8. In the illustrated examples, this is accomplished by extending the nose assembly 704 different extents into the framework 200 of the robotic head. In other examples, the nose assembly 704 may include a base portion that is attached to the framework 200 at a fixed depth within the second opening 210 and an extendable portion that may protrude from or retract into (e.g., telescopic) the base portion to adjust the length of the nose. In some examples, the length of the nose assembly 704 protruding from the framework 200 may be randomly or pseudo-randomly selected to provide variation in the visual appearance of one robot relative to another.

Figure 8:
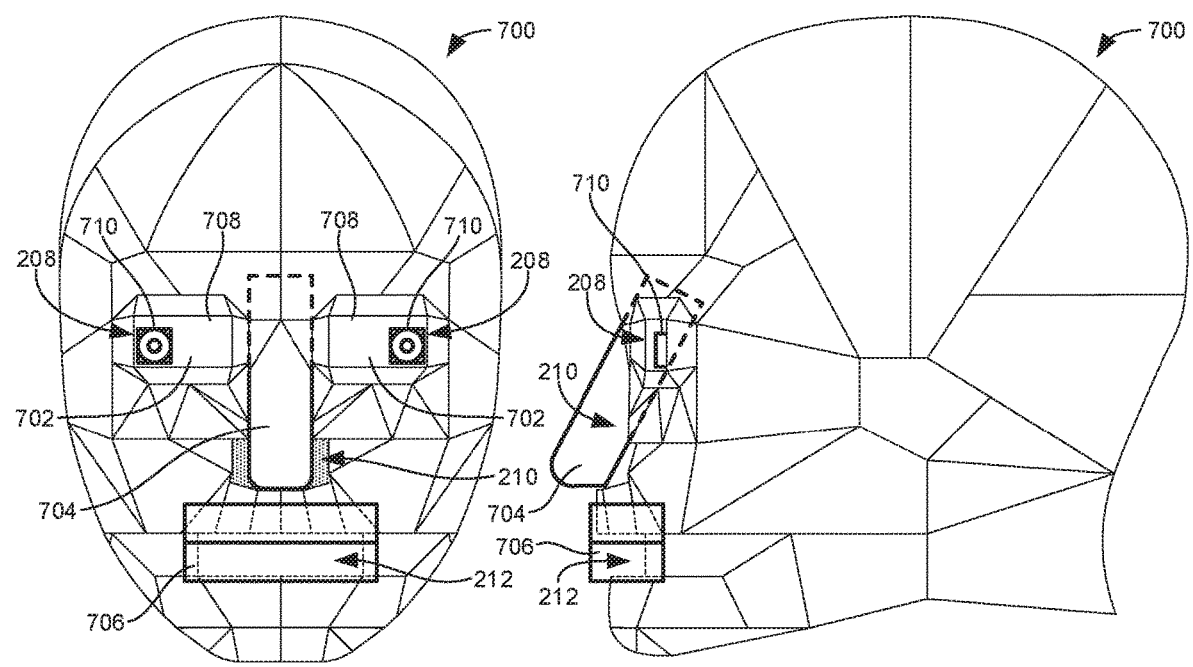
FIG. 8 is a front view and a profile view of the example framework of FIG. 2 with the example eyes, nose, and mouth assemblies connected to the framework in a different example arrangement than the arrangement of FIG. 7.

In some examples, the mouth assembly 706 may be vertically adjusted relative to the framework 202 between a lower position (FIG. 7) and an upper position (FIG. 8). In some examples, the mouth assembly 706 includes upper and lower portions associated with the upper jaw (maxilla) and lower jaw (mandible) of the robot. In some examples, the upper and lower portions of the mouth assembly 706 may be independently adjusted in the vertical direction relative to the framework 202 of the robotic head. As with the eye assemblies 702 and the nose assembly 704, the position of the components of the mouth assembly 706 may be randomly or pseudo-randomly selected when manufacturing a robotic head to provide variation in the appearance of one robot relative to another.

Figure 9:
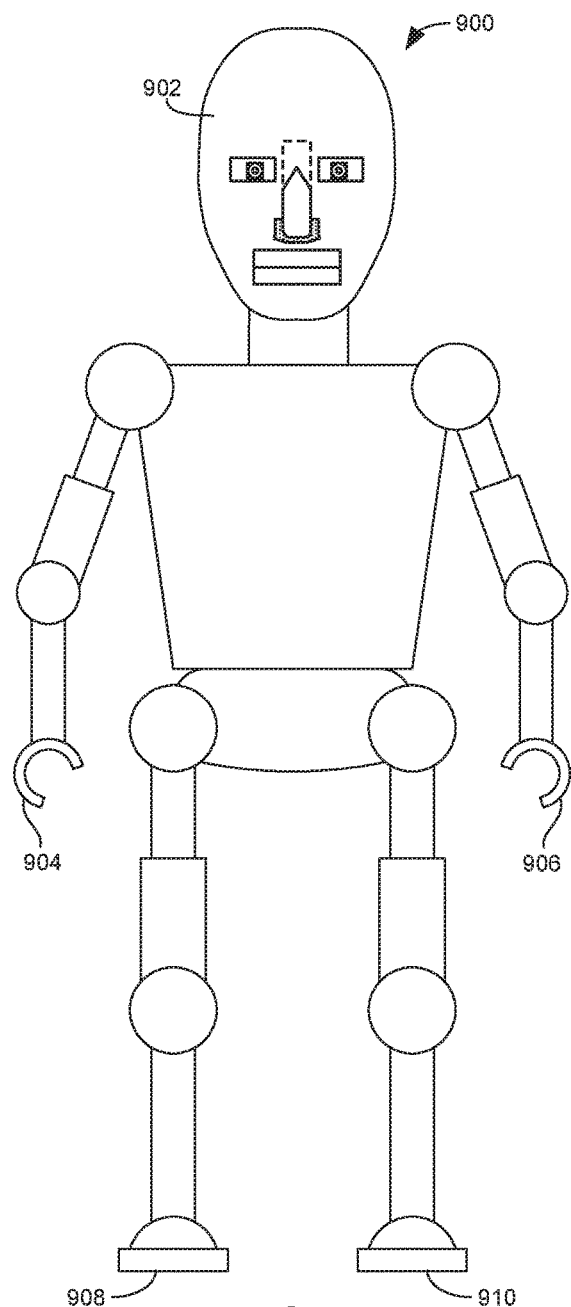
FIGS. 9 and 10 illustrate example robots constructed in accordance with teachings disclosed herein.
Figure 10:
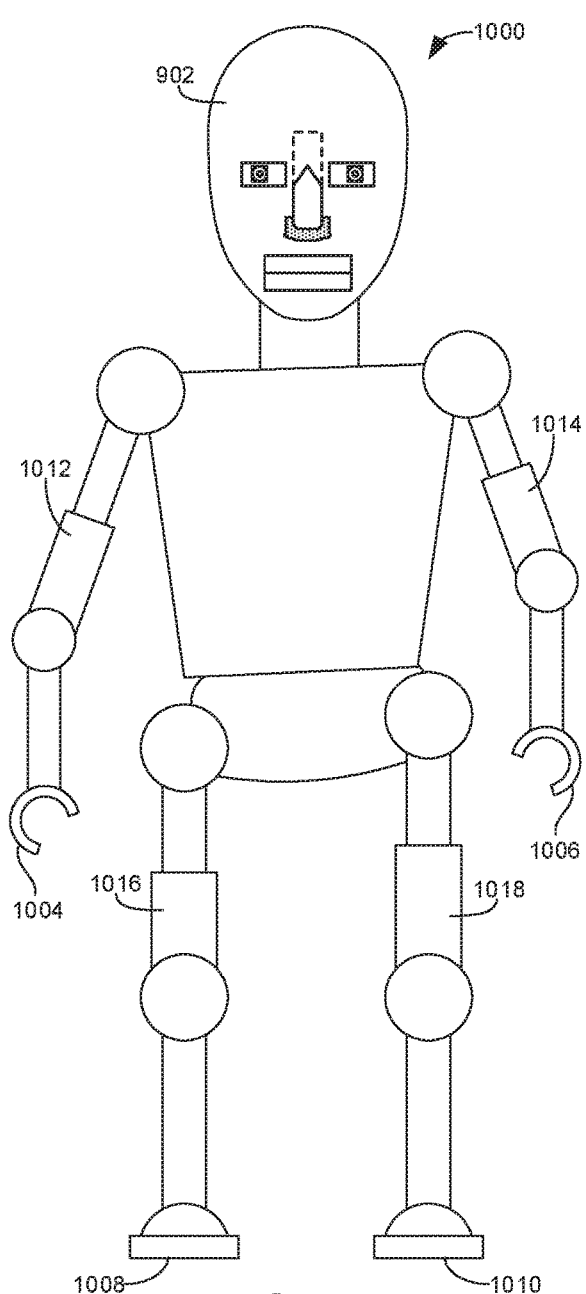

The foregoing discussion has primarily focused on generating variation in facial and/or head features of humanoid robots to enable humans to visually distinguish one robot from another. Variation in other aspects of the physical appearance corresponding to other anatomical features of humans may also be incorporated into the body of humanoid robots as shown in FIGS. 9 and 10. Thus, changes in the facial/head features may be used in addition to, or in place of, differences in body shape (and/or vice versa) to achieve visual distinctiveness between robots. In particular, FIGS. 9 and 10 illustrate two example robots 900, 1000 constructed in accordance with teachings disclosed herein. Each of the robots 900, 1000 includes a corresponding robotic head 902, 1002 is constructed with a unique appearance in accordance with the description of FIGS. 2-8. That is, the robotic heads 902, 1002 of FIGS. 9 and 10 are constructed with the same components but have slightly different shapes and positions for the eyes, nose, and mouth based on differences in the relative placement and/or arrangement of the components used to form the robotic heads 902, 1002.

The robots 900, 1000 of the examples of FIGS. 9 and 10 further differ in their appearance based on the structure of their bodies. The robot 900 of FIG. 9 has a symmetrical body with a right arm 904 that is the same length as the left arm 906 and a right leg 908 that is the same length as the left leg 910. By contrast, the robot 1000 of FIG. 10 has a non-symmetrical body with a right arm 1004 that is longer than the left arm 1006 and a right leg 1008 that is shorter than the left leg 1010. In the illustrated example of FIG. 10, the right arm 1004 is longer than the left arm 1006 because the upper arm segment 1012 (corresponding to the humerus bone in a human) of the right arm 1004 is longer than the upper arm segment 1014 of the left arm 1006. Further, the right leg 1008 is shorter than the left leg 1010 because the upper leg segment 1016 (corresponding to the femur bone in a human) of the right leg 1008 is shorter than the upper leg segment 1018 of the left leg 1010. While the lengths of the appendages of the robot 1000 of FIG. 10 are shown to be significantly different for purposes of illustration, in some examples, the difference in length of one leg to another and/or one arm to another may be relatively small. Even relatively small variations may affect the overall appearance of the robot 1000 by altering the stance, stature, posture, and/or gait of the robot 1000 in a manner that is perceptible to humans, thereby providing additional and/or alternative ways for a human to visual identify a particular robot.

In the illustrated example of FIG. 10, the upper arm segments 1012, 1014 and the upper leg segments 1016, 1018 include separate upper and lower portions that may be moved relative to one another to either lengthen or shorten their combined length. In some examples, the upper and lower portions of each upper arm segment 1012, 1014 and each upper leg segment 1016, 1018 are positioned relative to one during assembly of the robot and then fixed in their relative position using any suitable securing means (e.g., an adhesive, threaded fasteners, welding, etc.). In this manner, different lengths of arms and/or legs may be constructed using the same components for each such arm and/or leg (with the possible difference of different sized and/or shaped connectors). In other examples, the upper arm segments 1012, 1014 and/or the upper leg segments 1016, 1018 are constructed from a unitary piece of material. In such examples, the different lengths for the portions of the different arms and legs are achieved based on the manufacturing of the unitary pieces and the selection of the unitary pieces during assembly of a given robot. For example, the portions of the arms and legs may be formed from rods or tubes that are cut to the particular length intended for each appendage or portion thereof.

While FIGS. 9 and 10 illustrate differences in the length of the upper portions of arms and legs of the robots 900, 1000, a similar approach may be followed to vary the appearance of any physical aspect of the robots (e.g., lower arms, lower legs, hips, shoulders, torso, neck, hands, feet, etc.). Moreover, length is not the only factor that may be changed. Instead, other dimensions may be varied such as width or diameter of the limbs, etc. Furthermore, the same principles outlined above may be used in non-humanoid robots. That is, any type of robot may be mass produced using common components that are assembled in such a way that different ones of the mass produced robots have a unique appearance that facilitates human visual differentiation of one robot from another to identify a particular robot with relative ease based on visual inspection (e.g., a simple glance).

As described above, robots with distinguishable features may be mass produced from the same or substantially the same (e.g., with different connectors but otherwise identical parts) components by introducing randomness or pseudo-randomness into the relative position of the components as they are assembled. In some examples, the spatial relationships of components may be defined, at least partially, in a non-random fashion so that particular robots, though individually distinctive, may share some resemblance. Just as siblings or parents and children of a particular family may resemble one another, robots may be manufactured to resemble one another in accordance with teachings disclosed herein. In some examples, this is accomplished by defining one or more measurements, shapes, or designs of a first robot as inheritable features that serve as constraints in the random or pseudo-random selection of the spatial relationships of components assembled for a second robot. In some examples, the second robot can be constructed to exhibit the same inheritable feature as the first robot to provide a resemblance between the robots (e.g., create a visual impression of siblings, parent-child, etc.). In other examples, the second robot can be constructed to have a measurement, shape, or design that is within a certain threshold of the inheritable feature of the first robot (e.g., within 10% of the full range of variability for the feature).

In some examples, the appearance of a robot may be based on the features of more than one robot. In some examples, the way in which multiple robots affect the appearance of a new robot to be constructed is based on a model following theories of genetic inheritance observed in nature. For example, different robots with certain inheritable features may be modeled as "parents" that define certain physical traits for a new "child" robot may inherit. As used herein, the term "inherit" in the context of robot design and fabrication means that a feature (e.g., measurement, shape, etc.) of a first robot is used as a constraint in a second robot such that the same or similar feature (e.g., the same or similar measurement or shape) exhibited in the first feature is incorporated into the second robot to establish some resemblance between the first and second robots. As is apparent from this definition, the design and construction of particular robots based on the principles of inheritance are not limited to the processes of nature, DNA, and/or genetics.

For example, any number (e.g., 1, 2, 3, 4, etc.) of robots may be defined as "parents" from which a robot may inherit one or more features. In some such examples, the "child" robot is constructed to have an appearance based on physical features corresponding to a weighted average of the inheritable features of the "parent" robots. In some examples, a particular inheritable feature of one of the parent robots may be selected for the child robot without regard to the particular measurements associated with the same feature in other ones of the parents. In some examples, the selection of the robot from which a particular feature is inherited may be designated by a robot designer. In other examples, the selection of the particular robot from which a particular feature is inherited may be determined in a random or pseudo-random manner and/or based on a statistical model of inheritance. Unlike natural processes, the "parent" robots need not be manufactured before a "child" robot is designed. Rather, multiple robots may be designed before construction with certain ones of the designs including designated inheritable features used as constraints in the designs of other ones of the robots.

Figure 11:
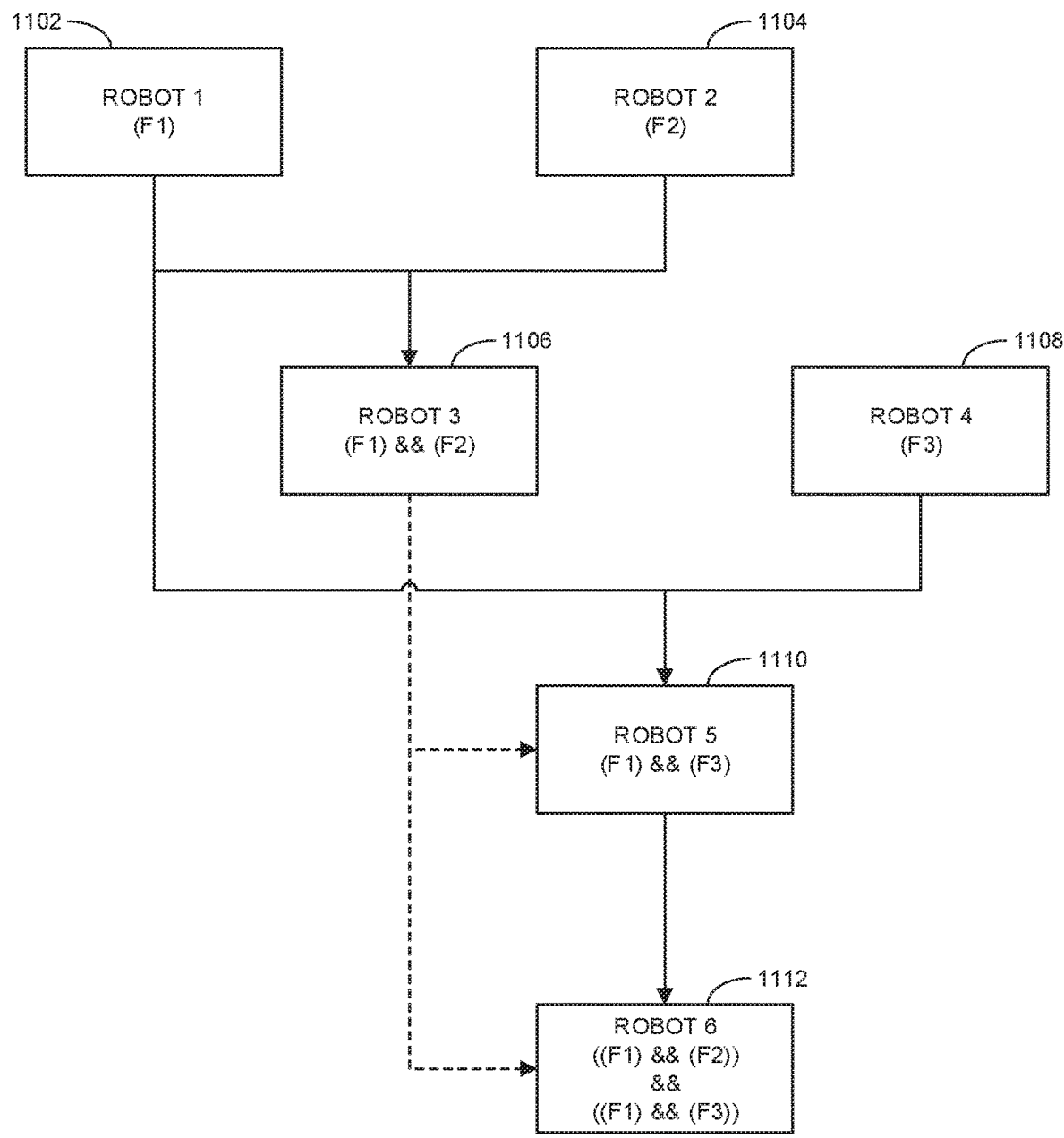
FIG. 11 schematically illustrates ways in which certain robots may incorporate features of other robots based on principles of genetic inheritance.

FIG. 11 schematically illustrates ways in which certain robots may incorporate features of other robots based on principles of inheritance. In the illustrated example, the solid arrows represent situations where a robot designer has explicitly called out particular features to be incorporated in new robot designs. By contrast, the arrows shown in dashed lines represent features that may or may not be inherited based on a statistical model of inheritance. Thus, as shown in the illustrated example a first robot 1102 includes a first inheritable feature (F1) and a second robot 1104 includes a second inheritable feature (F2). In the illustrated example, both the first and second inheritable features (F1 and F2) are passed on to a third robot 1106 by specific callout or designation. Similarly, the first inheritable feature (F1) from the first robot 1102 and a third inheritable feature (F3) from a fourth robot 1108 are explicitly assigned to a fifth robot 1110. Thus, in the illustrated example, both the third robot 1106 and the fifth robot 1110 include the first feature (F1) from the first robot 1102. In some examples, the first feature (F1) in the third and fifth robots 1106, 1110 may substantially duplicate the first feature (F1) of the first robot 1102 to increase the resemblance between the robots. In such examples, each of the first, third, and fifth robots 1102, 1106, 1110 may be distinguishable based on human observation based on variation in other aspects of the appearance of the robots. In other examples, the first feature (F1) in the third and fifth robots 1106, 1110 may include some variation relative to the first robot 1102 within a narrow threshold (e.g., 5%, 10%, 15%, etc.) to retain at least some similarity between the robots without requiring the feature to be exactly copied.

In the illustrated example of FIG. 11, both the fifth robot 1110 and a sixth robot 1112 are designed to incorporate the features of the third robot 1106 based on a statistical model of inheritance (as represented by the dashed lines). Research of inheritance in nature has shown that not every feature of a parent is inherited in a child every time. For example, research has shown that approximately two thirds of people inherit the tip of their nose from their parents, while the remaining third of people will have a nose that varies from their parents. Thus, although a particular physical trait may be inheritable, the trait may not manifest itself in each case. This phenomenon may be incorporated into inheritable features passed from one robot to another as represented in FIG. 11. Although the features of the third robot 1106 are assigned to be inherited by both the fifth and sixth robots 1110, 1112, based on a random or pseudo-random selection of the features according to probabilities defined by an inheritance model for the features (F1 and F2), the features of the third robot 1106 are not incorporated into the fifth robot 1110, but they are incorporated into the sixth robot 1112. The sixth robot 1112 also includes the inheritable features of the fifth robot 1110 based on an explicit designation by a robot designer (as represented by the solid line). Thus, in some examples, resemblances between distinctive robots may be implemented by modelling theories of inheritance observed in nature. In such examples, not every feature designated for inheritance may be passed to a new robot depending on the probability of inheritance for the designated feature. When a particular inheritable feature is determined to not be inherited by the particular robot, the robot may be designed and/or constructed with measurements associated with the feature at any suitable point on the full range of variability for the feature without being constrained by the measurement of the feature of the "parent" robot(s).

Figure 12:
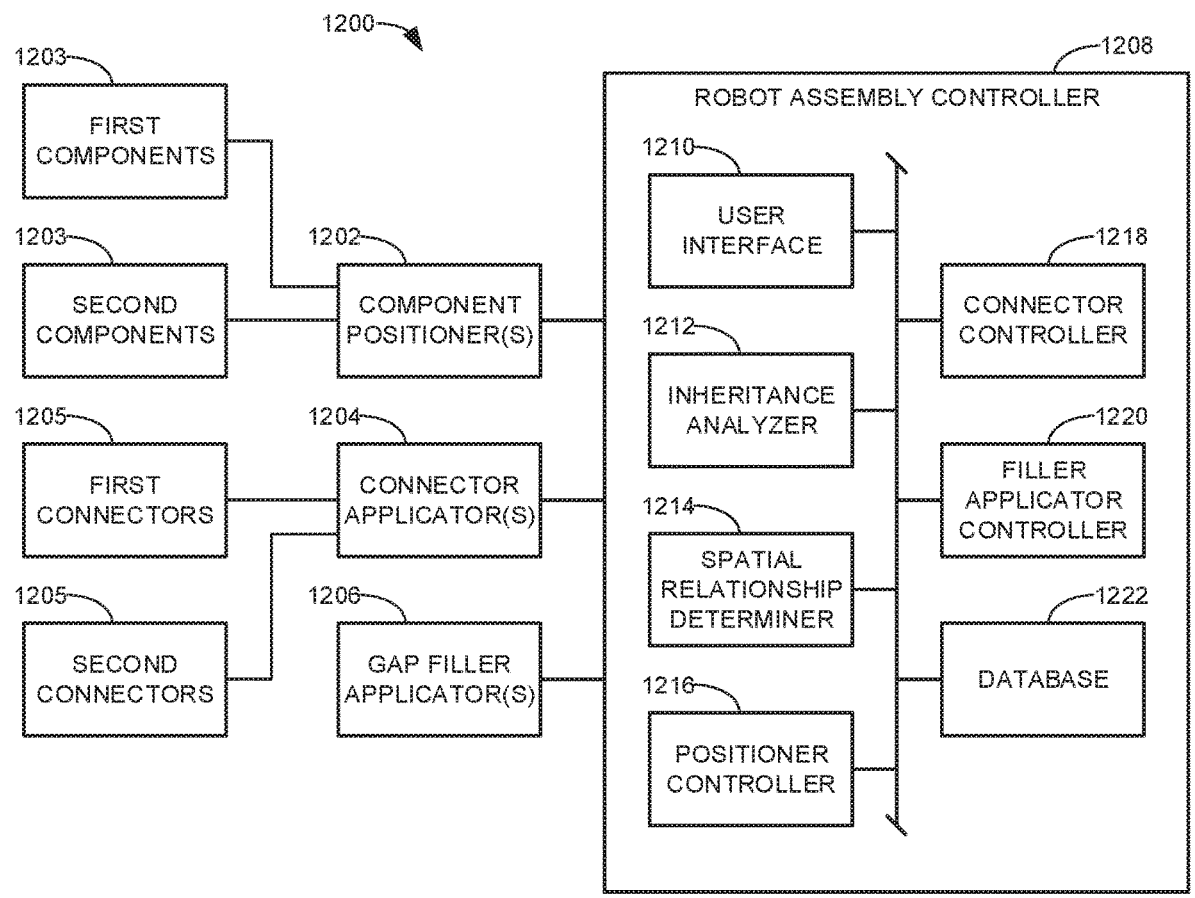
FIG. 12 illustrates an example system that may be implemented to construct individualized robots in accordance with teachings disclosed herein.

FIG. 12 illustrates an example system 1200 that may be implemented to construct individualized robots in accordance with teachings disclosed herein. The system 1200 of FIG. 12 includes one or more example component positioner(s) 1202, one or more example bins or other containers 1203 of different components, one or more example connector applicator(s) 1204, one or more example bins or other containers 1205 of different connectors and/or connector material(s), one or more example gap filler applicator(s) 1206, and an example robot assembly controller 1208.

The one or more component positioner(s) 1202 hold or position each component (e.g., the components 206 of FIGS. 2-8) of a robot in a specified position for assembly with other components of the robot. In some examples, the components 206 for successive robots are obtained from a corresponding bin or container 1203 of such components. In some examples, the specified position for each component is based on the spatial relationships defined between different ones of the components. As described above, the spatial relationships between particular components may differ from one robot to another even though the same components are used in each case. Thus, in some examples, the component positioner(s) 1202 are capable of adjusting the position of each component during assembly of a robot. In some examples, the component positioner(s) 1202 include robotic manipulator arms that may rotate and/or move a particular component through all six degrees of freedom within three-dimensional space in a controlled manner to facilitate variation in the position of each component of each robot. In some examples, more than one component positioner 1202 may be implemented to position a single component. For instance, a first component positioner 1202 may provide a mechanical stop against which a second component positioner 1202 may hold a particular component. In such examples, the mechanical stop of the first component positioner 1202 may limit one or more degrees of freedom and/or otherwise guide movement of a component actuated by the second component positioner 1202. In some examples, different component positioners 1202 may be implemented to position different components. In other examples, the same component positioner 1202 may be used to position multiple different components.

The example connector applicator(s) 1204 add connectors (e.g., the connectors 402, 502 of FIGS. 4 and 5) between adjacent components to secure the components in their specified spatial relationship in which they are held by the component positioner(s) 1202. In some examples, the connectors and/or associated material(s) to form such connectors for successive robots are obtained from the corresponding bins or containers 1205 of such connectors and/or associated material(s). In some examples, the connector applicator(s) 1204 include robotic manipulator arms with suitable connector tool(s) (e.g., welder, adhesive dispenser, riveter, drill, etc.) to form the connectors 402, 502.

The example gap filler applicator(s) 1206 applies a structural filler material in between gaps (e.g., the gaps 504 shown in FIG. 5) formed between adjacent components coupled with the connectors. The gap filler applicator(s) 1206 may also apply the structural filler material over any other portion of the components and/or the associated connectors to smooth out or otherwise alter the shape of the assembled components and/or to increase the structural integrity of the assembled components. In some examples, the gap filler applicator(s) 1206 include robotic manipulator arms that control a dispenser of the structural filler material.

In the illustrated example of FIG. 12, the example robot assembly controller 1208 controls the one or more example component positioner(s) 1202, the one or more example connector applicator(s) 1204, and/or the one or more example gap filler applicator(s) 1206. In this example, the example robot assembly controller 1208 includes an example user interface 1210, an example inheritance analyzer 1212, an example spatial relationship determiner 1214, an example positioner controller 1216, an example connector controller 1218, an example filler applicator controller 1220, and an example database 1222.

The example user interface 1210 enables a user (e.g., a robot designer) to input specifications and/or design constraints for one or more robots. For example, a user may provide, via the user interface 1210, an end state model for a robot defining certain measurements and/or constraints for particular features in the appearance and/or design of a robot. In some examples, a user may provide parameters defining whether certain features in a particular robot are to be inherited from one or more other robots. In some examples, the constraints, inheritable feature parameters, and/or other user inputs may be stored in the database 1222.

The example inheritance analyzer 1212 may determine definitions for inheritable features of a robot. In some examples, the definitions for inheritable features are determined based on input provided by a user regarding particular features and/or associated components used in the construction of the robot. In some examples, the definitions for inheritable features are determined based on end state models of a robot. The example inheritance analyzer 1212 may also identify the robots from which inheritable features are to be inherited by or incorporated into a new robot. In such examples, the robots from which the features are to be inherited may have already been constructed or merely designed with the relevant parameters stored in the example database 1222.

In some examples, the inheritance analyzer 1212 applies an inheritance model to determine when a particular robot is to be limited or constrained in the available variation of appearance by inheriting a feature from a different robot. In other examples, whether a feature in one robot is applied to another robot may be explicitly called out by user instructions. In some examples, the inheritance analyzer 1212 may determine the degree of similarity of an inheritable feature of a first robot that is inherited by a second robot. In some examples, the feature in the first robot may be substantially the same as the feature in the second robot. In other examples, the inheritance analyzer 1212 may introduce random or pseudo-random variability in the inheritable feature between the two robots within a certain threshold.

The example spatial relationship determiner 1214 may calculate the spatial relationship between different components in a robot to be assembled. In some examples, the spatial relationship determiner 1214 determines spatial relationships based on the definitions for inheritable features determined by the example inheritance analyzer 1212. Additionally or alternatively, the spatial relationship determiner 1214 determines spatial relationships based on other constraints defined for individual ones of the components and/or particular features of the robot. In some examples, these constraints may correspond to a range of variability associated with a particular feature observed in nature. In some examples, the constraints may be defined by a user independent of what is observed in nature. In some examples, the spatial relationships calculated by the spatial relationship determiner 1214 are partially based on the output of a random or pseudo-random number generator to introduce randomness or pseudo-randomness or variability into the relationships between given components for different robots.

In some examples, the level of randomness or variability is limited to within certain ranges based on the inheritable features and/or other constraints mentioned above.

In some examples, the spatial relationship determiner 1214 determines the spatial relationships between all components of a robot before assembly of the components begins. In other examples, the spatial relationship determiner 1214 determines spatial relationships between different components as the components are being assembled. In some such examples, the spatial relationships of previously coupled components may serve as additional constraints on the spatial relationships for subsequent components to be added to the robot.

The example positioner controller 1216 analyzes the spatial relationships determined by the spatial relationship determiner 1214 to control the component positioner(s) 1202. Similarly, the connector controller 1218 analyzes the spatial relationships determined by the spatial relationship determiner 1214 to control the connector applicator(s) 1204. Likewise, the filler applicator controller 1220 analyzes the spatial relationships determined by the spatial relationship determiner 1214 to control the gap filler applicator(s) 1206. In some examples, the positioner controller 1216, the connector controller 1218, and/or the filler applicator controller 1220 are omitted from the robot assembly controller 1208. In some such examples, the positioner controller 1216, the connector controller 1218, and/or the filler applicator controller 1220 may be implemented in respective ones of the component positioner(s) 1202, the connector applicator(s) 1204, and/or the gap filler applicator(s) 1206.

While an example manner of implementing the robot assembly controller 1208 of FIG. 12 is illustrated in FIG. 12, one or more of the elements, processes and/or devices illustrated in FIG. 12 may be combined, divided, re-arranged, omitted, eliminated and/or implemented in any other way. Further, the example user interface 1210, the example inheritance analyzer 1212, the example spatial relationship determiner 1214, the example positioner controller 1216, the example connector controller 1218, the example filler applicator controller 1220, the example database 1222, and/or, more generally, the example robot assembly controller 1208 of FIG. 12 may be implemented by hardware, software, firmware and/or any combination of hardware, software and/or firmware. Thus, for example, any of the example user interface 1210, the example inheritance analyzer 1212, the example spatial relationship determiner 1214, the example positioner controller 1216, the example connector controller 1218, the example filler applicator controller 1220, the example database 1222 and/or, more generally, the example robot assembly controller 1208 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 1210, the example inheritance analyzer 1212, the example spatial relationship determiner 1214, the example positioner controller 1216, the example connector controller 1218, the example filler applicator controller 1220, and/or the example database 1222 is/are hereby expressly defined to include a non-transitory computer readable storage device or storage disk such as a memory, a digital versatile disk (DVD), a compact disk (CD), a Blu-ray disk, etc. including the software and/or firmware. Further still, the example robot assembly controller 1208 of FIG. 12 may include one or more elements, processes and/or devices in addition to, or instead of, those illustrated in FIG. 12, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 13:
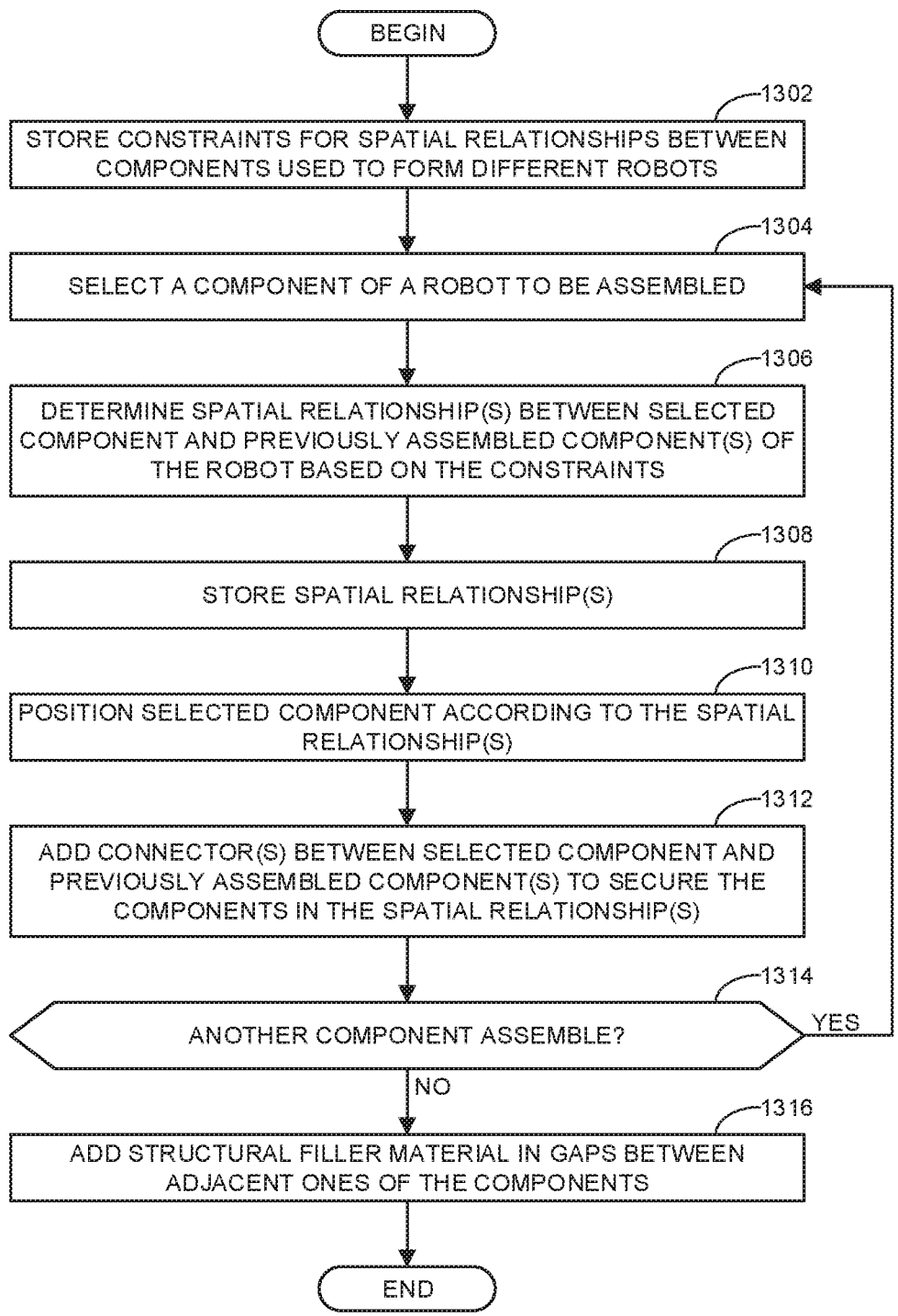
FIGS. 13 and 14 are flowcharts representative of example machine readable instructions which may be executed to implement the example robot assembly controller of FIG. 12.
Figure 14:
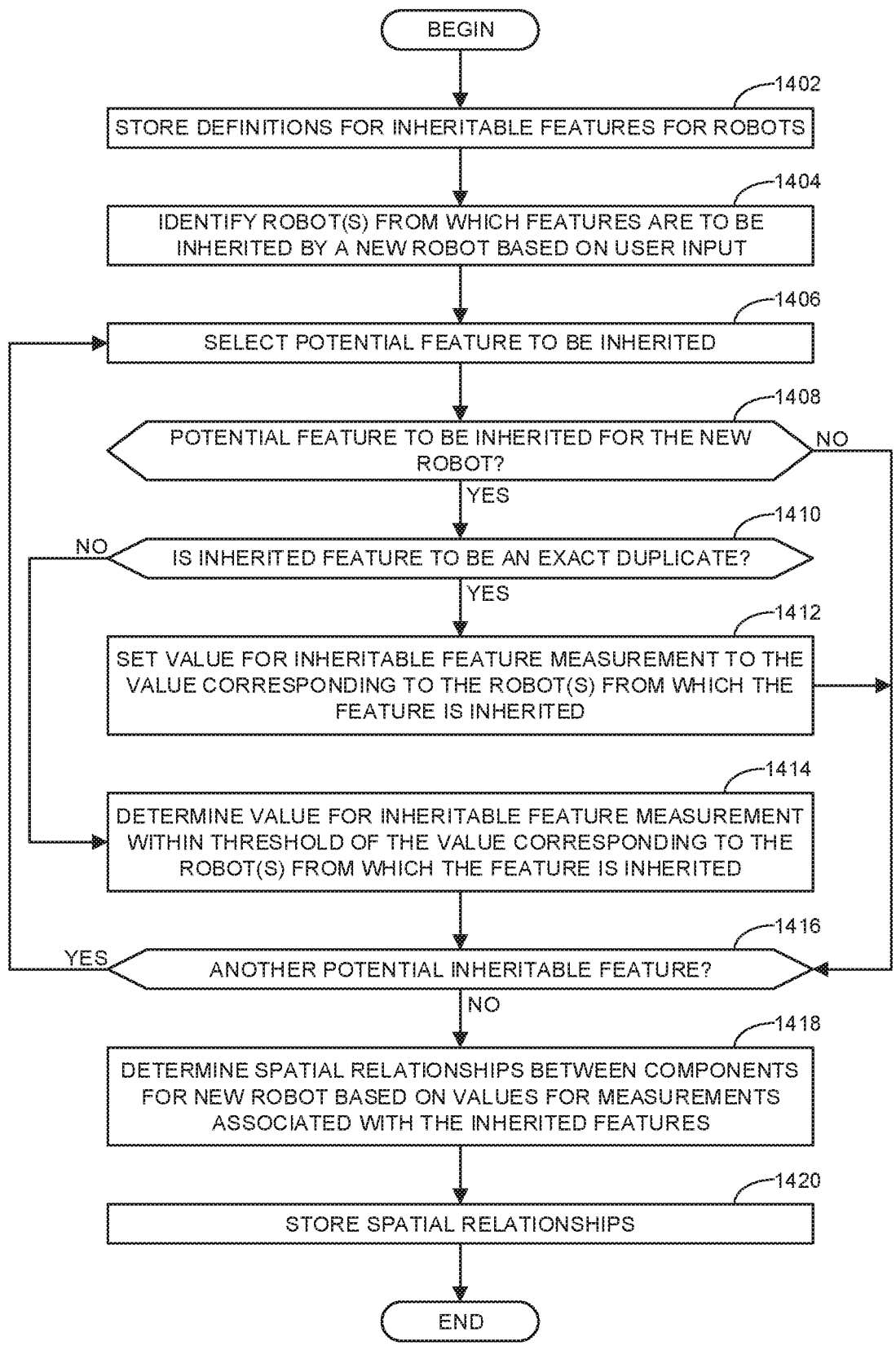

Flowcharts representative of example hardware logic or machine readable instructions for implementing the robot assembly controller 1208 of FIG. 12 are shown in FIGS. 13 and 14. The machine readable instructions may be a program or portion of a program for execution by a processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowcharts illustrated in FIGS. 13 and 14, many other methods of implementing the example robot assembly controller 1208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 13 and 14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The program of FIG. 13 begins at block 1302 where the example database 1222 stores constraints for spatial relationships between components (e.g., the components 206) used to form different robots. In some examples, the constraints are received as user inputs via the example user interface 1210. The constraints may define ranges of available variability between different ones of the components 206 and/or ranges of variability for particular features (which may be based on the relationship of more than two components 206). In some examples, the constraints are defined by an end state model for a particular robot. In some examples, the constraints may identify features that are to be inherited from other robots. For purposes of explanation, inheritable features are not discussed in connection with FIG. 13 but are addressed further below in connection with FIG. 14.

At block 1304, the example spatial relationship determiner 1214 selects a component 206 of a robot to be assembled. At block 1306, the example spatial relationship determiner 1214 determines the spatial relationship(s) between the selected component 206 and previously assembled component(s) 206 of the robot based on the constraints. In some examples, the spatial relationship(s) associated with the selected component 206 may be determined before construction of the robot. In other examples, the spatial relationships determined for the previously selected components 206 may serve as additional constraints on subsequently assembled components. Accordingly, in some examples, control advances to block 1308 where the example database 1222 stores the spatial relationship(s) determined for the selected component.

At block 1310, the example positioner controller 1216 positions (e.g., via the component positioner(s) 1202) the selected component 206 according the spatial relationship(s). At block 1312, the example connector controller 1218 adds (e.g., via the connector applicator(s) 1204) connectors (e.g., the connectors 402, 502) between the selected component 206 and the previously assembled component(s) 206 to secure the components 206 in the spatial relationship(s).

At block 1314, the spatial relationship determiner 1214 determines whether there is another component 206 to assemble. If so, control returns to block 1304 to repeat the process for a newly selected component 206. Otherwise, control advances to block 1316 where the example filler applicator controller 1220 adds (e.g., via the gap filler applicator(s) 1206) structural filler material (e.g., the structural filler material 602) in gaps (e.g., the gaps 504) between adjacent ones of the components 206. Thereafter, the example program of FIG. 13 ends.

FIG. 14 is a flowchart representative of hardware logic or machine readable instructions for implementing the robot assembly controller 1208 to design a robot based on principles of inheritance. The example program begins at block 1402 where the example database 1222 stores definitions for inheritable features for robots. In some examples, the inheritable features correspond to the features, measurements, and/or other constraints used to define the robots. In some examples, the identified inheritable features correspond to a subset of all features defining the robots and/or to combinations or groups of such features.

At block 1404, the example user interface 1210 identifies the robot(s) from which features are to be inherited by a new robot based on user input. At block 1406, the example inheritance analyzer 1212 selects a potential feature to be inherited. At block 1408, the example inheritance analyzer 1212 determines whether the potential feature is to be inherited for the new robot. In some examples, whether a potential feature to be inherited is, in fact, inherited in a particular instance is based on the evaluation of an inheritance model defining probabilities of inheritance of the particular feature. That is, the inheritance analyzer 1212 may determine whether the feature is inherited based on whether a randomly or pseudo-randomly generated number falls within or outside the probability defined for the inheritance of the particular feature. In other examples, the inheritance of a particular feature may be explicitly called out by a user via the user interface 1210. If the example inheritance analyzer 1212 determines that the potential feature is to be inherited for the new robot, control advances to block 1410.

At block 1410, the example inheritance analyzer 1212 determines whether the inherited feature is to be an exact duplicate. If so, at block 1412, the example inheritance analyzer 1212 sets a value for the inheritable feature measurement to the value corresponding to the robot(s) from which the feature is inherited. Thereafter, control advances to block 1416. If the example inheritance analyzer 1212 determines that the inherited feature is not to be an exact duplicate, control advances to block 1414 where the example inheritance analyzer 1212 determines a value for the inheritable feature measurement within a threshold of the value corresponding to the robot(s) from which the feature is inherited. Thereafter, control advances to block 1416. Returning to block 1408, if the example inheritance analyzer 1212 determines that the potential feature is not to be inherited for the new robot, control advances directly to block 1416.

At block 1416, the example inheritance analyzer 1212 determines whether there is another potential inheritable feature. If so, control returns to block 1406. Otherwise, control advances to block 1418 where the example spatial relationship determiner 1214 determines spatial relationships between components 206 for the new robot based on the values for the measurements associated with the inherited features. At block 1420, the example database 1222 stores the determined spatial relationships. Thereafter, the example process of FIG. 14 end.

Figure 15:
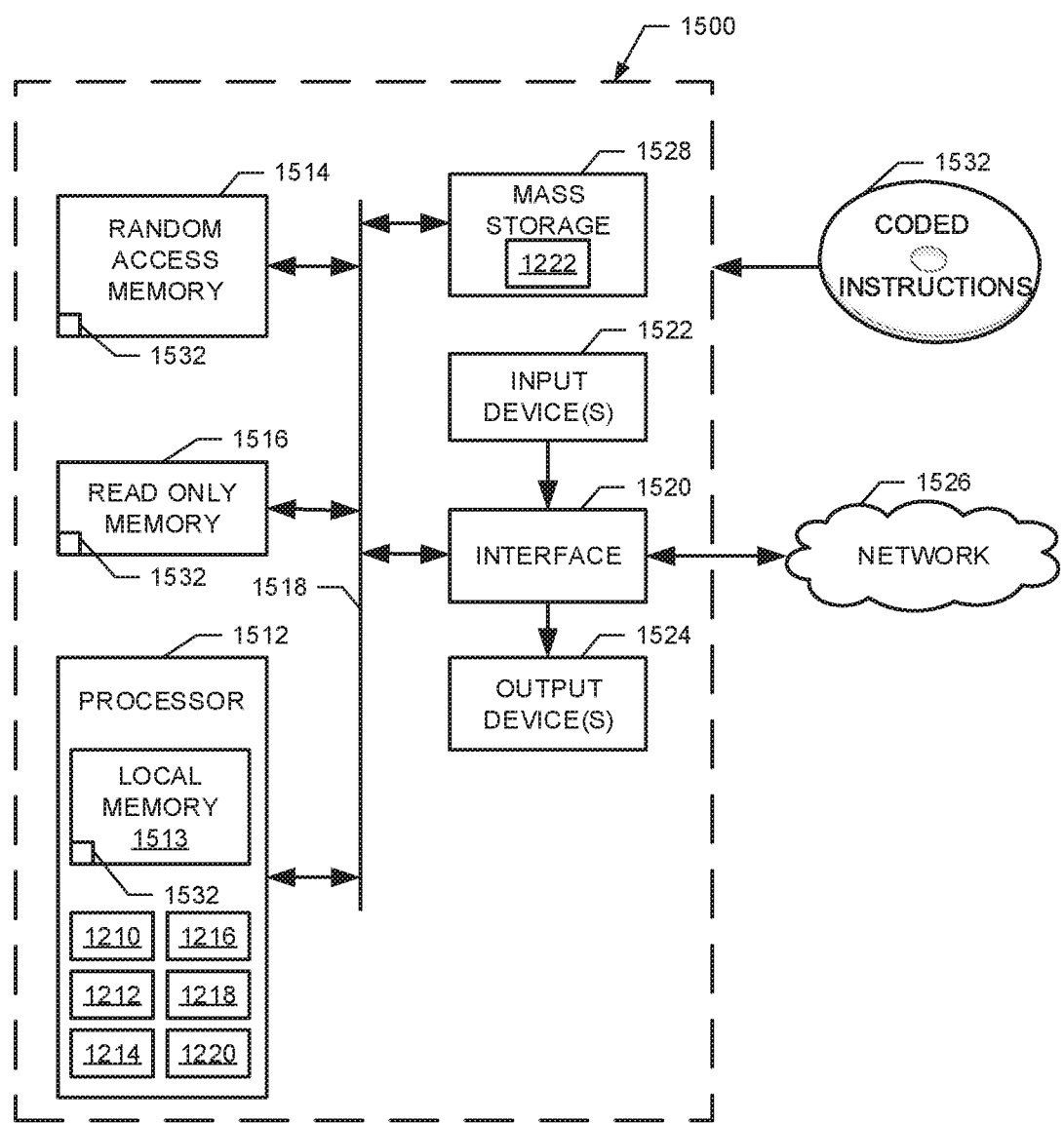
FIG. 15 is a block diagram of an example processing platform structured to execute the instructions of FIGS. 13 and 14 to implement the example robot assembly controller of FIG. 12.

FIG. 15 is a block diagram of an example processor platform 1500 structured to execute the instructions of FIGS. 13 and 14 to implement the robot assembly controller 1208 of FIG. 12. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user interface 1210, the example inheritance analyzer 1212, the example spatial relationship determiner 1214, the example positioner controller 1216, the example connector controller 1218, and the example filler applicator controller 1220.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives. In this example, the mass storage devices 1528 include the example database 1222.

The machine executable instructions 1532 of FIGS. 13 and 14 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that enable the manufacturing of visually distinguishable robots using the same components. The use of the same components for different robots facilitates the high volume production of such robots in a cost effective manner. In some examples, the difference in appearance between different robots fabricated using the same components is based on the different spatial relationships in which the components are secured during assembly. In some examples, the differences between the appearance of different robots are based on differences in anatomical features observes in nature. Modifying the appearance of robots in this manner takes advantage of humans' innate capacity to distinguish one person from another based on minor variations in such anatomical features between different people.

Example 1 includes a kit for constructing a robot, comprising a first component for a framework of the robot, a second component for the framework, and a connector to secure the first and second components in a spatial relationship of a plurality of possible spatial relationships, the spatial relationship to cause the robot to have a humanly perceptible identity.

Example 2 includes the kit as defined in example 1, wherein the spatial relationship defines at least one of a distance between the first and second components or an angular offset between and the first and second components.

Example 3 includes the kit as defined in any one of examples 1 or 2, wherein the plurality of possible spatial relationships is defined based on a range of variability of a corresponding anatomical feature.

Example 4 includes the kit as defined in any one of examples 1-3, wherein the spatial relationship defines a gap between the first and second components, and further including a filler material to fill in the gap and provide structural reinforcement.

Example 5 includes the kit as defined in any one of examples 1-4, further including an eye assembly to attach to the framework, the eye assembly having a base and an image sensor, the image sensor moveable relative to the base in at least one of a vertical direction or a horizontal direction.

Example 6 includes the kit as defined in any one of examples 1-5, further including a nose assembly attachable to the framework in a first position or a second position, the robot appearing to have a longer nose when the nose assembly is in the first position than when the nose assembly is in the second position.

Example 7 includes the kit as defined in any one of examples 1-6, further including a mouth assembly having an upper portion and a lower portion, at least one of the upper portion or the lower portion being vertically moveable relative to the framework.

Example 8 includes the kit as defined in example 7, wherein at least one of the upper portion or the lower portion is vertically moveable relative to the other of the upper portion or the lower portion.

Example 9 includes the kit as defined in any one of examples 1-8, wherein the robot is a humanoid robot, and the framework is for a head of the humanoid robot.

Example 10 includes the kit as defined in example 9, further including a first leg having a first segment, and a second leg having a second segment, the first segment and the second segment corresponding to a same portion of the first and second legs, the second segment being shorter than the first segment to cause the robot to exhibit at least one of a humanly recognizable stance, a humanly recognizable posture, or a humanly recognizable gait.

Example 11 includes the kit as defined in any one of examples 1-10, wherein the robot is a first robot, the spatial relationship causes a visible feature in a second robot, the spatial relationship to cause the second robot to have a humanly perceptible resemblance to the first robot.

Example 12 includes a robot having an individualized appearance that is visually perceptible to a human, the robot comprising at least one processor, a motor, and a housing including a first structural component, a second structural component, the first and second structural components defining a shape of an outer surface of the housing, and a connector to couple the first and second structural components to affect the individualized appearance of the robot.

Example 13 includes the robot as defined in example 12, wherein the connector is to secure the first and second structural components in a spatial relationship of a plurality of possible spatial relationships.

Example 14 includes the robot as defined in example 13, wherein the spatial relationship causes the robot to resemble a second robot.

Example 15 includes the robot as defined in any one of examples 13 or 14, further including a filler to fill in a gap between the first and second structural components.

Example 16 includes the robot as defined in any one of examples 12-15, further including an eye assembly having an image sensor, the image sensor being selectively moveable relative to the housing.

Example 17 includes the robot as defined in any one of examples 12-16, further including a nose assembly carried by the housing in one of a first position or a second position, the robot appearing to have a longer nose when the nose assembly is in the first position than when the nose assembly is in the second position.

Example 18 includes the robot as defined in any one of examples 12-17, further including a mouth assembly having an upper portion and a lower portion, at least one of the upper portion or the lower portion being vertically moveable relative to the housing.

Example 19 includes the robot as defined in example 18, wherein at least one of the upper portion or the lower portion is vertically moveable relative to the other of the upper portion or the lower portion.

Example 20 includes the robot as defined in any one of examples 12-19, wherein the robot is a humanoid robot.

Example 21 includes the robot as defined in example 20, further including a first leg having a first segment, and a second leg having a second segment, the first segment and the second segment corresponding to a same portion of the first and second legs, the second segment being shorter than the first segment.

Example 22 includes a system comprising a first component positioner to hold a first component of a framework for a robot in a first position, the first position corresponding to a first spatial relationship with a second component, a second component positioner to hold the second component of the framework in a second position, the second position corresponding to the first spatial relationship, and a connector applicator to apply a first connector to fixedly attach the first component to the second component in the first spatial relationship, an appearance of the robot when the first and second components are connected in the first spatial relationship having a humanly perceptible difference from an appearance of the robot when the first and second components are connected in a second spatial relationship.

Example 23 includes the system as defined in example 22, wherein at least one of the first component positioner, the second component positioner, or the connector applicator includes a robotic manipulator arm.

Example 24 includes the system as defined in any one of examples 22 or 23, further including a robot assembly controller to select the first spatial relationship based on a random or pseudo-random number.

Example 25 includes the system as defined in example 24, wherein the first and second spatial relationships are limited to a range of variability in a visible feature of the robot.

Example 26 includes the system as defined in example 25, wherein the range of variability is based on a range of variability of an anatomical feature observable in humans.

Example 27 includes the system as defined in any one of examples 25 or 26, wherein the first spatial relationship is limited to a portion of the range of variability associated with a second robot to create an impression of an inherited feature.

Example 28 includes the system as defined in any one of examples 22-27, wherein the first spatial relationship is different than the second spatial relationship based on at least one of a distance between the first and second components or an angular offset between and the first and second components.

Example 29 includes the system as defined in any one of examples 22-28, further including a gap filler applicator to dispense a filler into a first gap between the first and second components when the first and second components are coupled in the first spatial relationship, and dispense the filler into a second gap between the first and second components when the first and second components are coupled in the second spatial relationship.

Example 30 includes an apparatus comprising a spatial relationship determiner to determine a first spatial relationship between first and second components of a framework for a robot, and a connector controller to control formation of a connector to fixedly attach the first component to the second component in the first spatial relationship, the first spatial relationship to cause a visible feature of the robot to have a visual appearance that is humanly distinguishable from the visible feature when the first and second components are in a second spatial relationship different than the first spatial relationship.

Example 31 includes the apparatus as defined in example 30, wherein the first spatial relationship defines a first distance between the first and second components and the second spatial relationship defines a second distance between the first and second components, the first distance being greater than the second distance.

Example 32 includes the apparatus as defined in any one of examples 30 or 31, wherein the first spatial relationship defines a first angular offset between the first and second components and the second spatial relationship defines a second angular offset between the first and second components, the first angular offset being greater than the second angular offset.

Example 33 includes the apparatus as defined in any one of examples 30-32, further including a positioner controller to control a position of at least one of the first and second components according to first spatial relationship during the formation of the connector.

Example 34 includes the apparatus as defined in any one of examples 30-33, further including a filler applicator controller to control application of a filler between a gap between the first and second components in the first spatial relationship.

Example 35 includes the apparatus as defined in any one of examples 30-34, wherein the robot is a first robot, and further including an inheritance analyzer to calculate a constraint on the first spatial relationship based on a measurement of the visible feature in a second robot, the constraint to establish a resemblance between the first and second robots.

Example 36 includes the apparatus as defined in example 35, wherein the first spatial relationship is constrained to cause the measurement of the visible feature in the second robot to be incorporated into the first robot.

Example 37 includes the apparatus as defined in any one of examples 35 or 36, wherein the first spatial relationship is constrained within a threshold of the measurement of the visible feature in the second robot.

Example 38 includes a non-transitory computer readable medium comprising instructions that, when executed, cause a machine to at least determine a spatial relationship between a first component of a framework for a robot and a second component of the framework, the spatial relationship determined based on a random or pseudo-random selection of a value within a designated range of variability between the first and second components, the spatial relationship to enable a human to visually identify the robot, position the first and second components according to the spatial relationship, and secure the first and second components in the spatial relationship.

Example 39 includes the non-transitory computer readable medium as defined in example 38, wherein the spatial relationship is a first spatial relationship and the framework is a first framework of a first robot, the instructions further causing the machine to determine a second spatial relationship between a third component of a second framework of a second robot and a fourth component of the second framework, the second spatial relationship being different than the first spatial relationship based on a different random or pseudo-random selection of a value within the designated range of variability, and secure the third and fourth components in the second spatial relationship.

Example 40 includes the non-transitory computer readable medium as defined in example 39, wherein the instructions further cause the machine to deposit a filler to fill a first gap between the first and second components, and deposit the filler to fill a second gap between the third and fourth components, the first gap being different than the second gap based on a difference between the first and second spatial relationships.

Example 41 includes the non-transitory computer readable medium as defined in any one of examples 38-40, wherein the robot corresponds to a humanoid robot.

Example 42 includes the non-transitory computer readable medium as defined in example 41, wherein the instructions further cause the machine to select a first measurement for an anatomical feature within a range of variability of the anatomical feature observable in humans, and define the designated range of variability based on the range of variability of the anatomical feature.

Example 43 includes the non-transitory computer readable medium as defined in any one of examples 38-42, wherein the spatial relationship is a first spatial relationship, the instructions further causing the machine to determine the first spatial relationship based on constraints defined by a second spatial relationship between corresponding components associated with a second robot.

Example 44 includes the non-transitory computer readable medium as defined in example 43, wherein the constraints are further defined by a third spatial relationship associated with a third robot, the instructions further causing the machine to determine the first spatial relationship based on a weighted average of the second and third spatial relationships.

Example 45 includes a method comprising determining, by executing an instruction via a processor, a spatial relationship between a first component of a framework for a robot and a second component of the framework, the spatial relationship determined based on a random or pseudo-random selection of a value within a designated range of variability between the first and second components, the spatial relationship to enable a human to visually identify the robot, positioning, via a component positioner, the first and second components according to the spatial relationship, and securing, via a connector applicator, the first and second components in the spatial relationship.

Example 46 includes the method as defined in example 45, wherein the spatial relationship is a first spatial relationship and the framework is a first framework of a first robot, the method further including determining a second spatial relationship between a third component of a second framework of a second robot and a fourth component of the second framework, the second spatial relationship being different than the first spatial relationship based on a different random or pseudo-random selection of a value within the designated range of variability, and securing the third and fourth components in the second spatial relationship.

Example 47 includes the method as defined in example 46, further including depositing a filler to fill a first gap between the first and second components, and depositing the filler to fill a second gap between the third and fourth components, the first gap being different than the second gap based on a difference between the first and second spatial relationships.

Example 48 includes the method as defined in any one of examples 45-47, wherein the robot corresponds to a humanoid robot.

Example 49 includes the method as defined in example 48, further including selecting a first measurement for an anatomical feature within a range of variability of the anatomical feature observable in humans, and defining the designated range of variability based on the range of variability of the anatomical feature.

Example 50 includes the method as defined in any one of examples 45-49, wherein the spatial relationship is a first spatial relationship, the method further including determining the first spatial relationship based on constraints defined by a second spatial relationship between corresponding components associated with a second robot.

Example 51 includes the method as defined in example 50, wherein the constraints are further defined by a third spatial relationship associated with a third robot, the method further including determining the first spatial relationship based on a weighted average of the second and third spatial relationship.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A robot, comprising:
a first panel for a framework of the robot;
a second panel for the framework separate from the first panel, the first and second panels to correspond to distinct regions of an exterior surface of the framework;
a rigid connector to secure the first and second panels in a first permanently fixed spatial relationship or a second permanently fixed spatial relationship of a plurality of possible spatial relationships, the first spatial relationship defining a gap between a first edge of the first panel and a second edge of the second panel, the first edge adjacent the second edge, the rigid connector coupled to the first edge and the second edge, the first panel immovable relative to the second panel when secured by the rigid connector, the first spatial relationship to cause the robot to have a first appearance that is visually distinguishable by a human from a second appearance of a second robot, the second appearance caused by the second robot being constructed with third and fourth panels secured in the second spatial relationship, the third and fourth panels having a same shape as the first and second panels; and an eye assembly to attach to the framework, the eye assembly having a base and an image sensor, the image sensor moveable relative to the base in at least one of a vertical direction or a horizontal direction.

2. The robot as defined in claim 1, wherein the first spatial relationship defines at least one of a distance between the first and second panels or an angular offset between and the first and second panels.

3. The robot as defined in claim 1, wherein the plurality of possible spatial relationships is defined based on a range of variability of a corresponding anatomical feature.

4. The robot as defined in claim 1, further including a filler material to fill in the gap and provide structural reinforcement.

5. The robot as defined in claim 1, wherein the robot is a humanoid robot, and the framework is for a head of the humanoid robot.

6. The robot as defined in claim 1, wherein the first and second appearances are such that the robot and the second robot are to have a humanly perceptible resemblance.

7. The robot as defined in claim 1, wherein the plurality of possible spatial relationships correspond to different spatial relationships between the first and second edges of the first and second panels.

8. The robot of claim 1, wherein an area of the gap is smaller than a surface area of the first panel.

9. The robot as defined in claim 1, wherein the first edge and the second edge are nonparallel when the first and second panels are in the first spatial relationship.

10. A robot comprising:

a first panel for a framework of the robot a second panel for the framework separate from the first panel, the first and second panels to correspond to distinct regions of an exterior surface of the framework;

a rigid connector to secure the first and second panels in a first permanently fixed spatial relationship or a second permanently fixed spatial relationship of a plurality of possible spatial relationships, the first spatial relationship defining a gap between a first edge of the first panel and a second edge of the second panel, the first edge adjacent the second edge, the rigid connector coupled to the first edge and the second edge, the first panel immovable relative to the second panel when secured by the rigid connector, the first spatial relationship to cause the robot to have a first appearance that is visually distinguishable by a human from a second appearance of a second robot, the second appearance caused by the second robot being constructed with third and fourth panels secured in the second spatial relationship, the third and fourth panels having a same shape as the first and second panels; and a nose assembly attachable to the framework in a first position or a second position, the robot appearing to have a longer nose when the nose assembly is in the first position than when the nose assembly is in the second position.

11. A robot as defined in claim 1, further including comprising:

a first panel for a framework of the robot a second panel for the framework separate from the first panel, the first and second panels to correspond to distinct regions of an exterior surface of the framework;

a rigid connector to secure the first and second panels in a first permanently fixed spatial relationship or a second permanently fixed spatial relationship of a plurality of possible spatial relationships, the first spatial relationship defining a gap between a first edge of the first panel and a second edge of the second panel, the first edge adjacent the second edge, the rigid connector coupled to the first edge and the second edge, the first panel immovable relative to the second panel when secured by the rigid connector, the first spatial relationship to cause the robot to have a first appearance that is visually distinguishable by a human from a second appearance of a second robot, the second appearance caused by the second robot being constructed with third and fourth panels secured in the second spatial relationship, the third and fourth panels having a same shape as the first and second panels; and a mouth assembly having an upper portion and a lower portion, at least one of the upper portion or the lower portion being vertically moveable relative to the framework.

12. The robot as defined in claim 11, wherein at least one of the upper portion or the lower portion is vertically moveable relative to the other of the upper portion or the lower portion.

13. A robot comprising:

a first panel for a framework of the robot, wherein the robot is a humanoid robot, and the framework is for a head of the humanoid robot;

a second panel for the framework separate from the first panel, the first and second panels to correspond to distinct regions of an exterior surface of the framework;

a rigid connector to secure the first and second panels in a first permanently fixed spatial relationship or a second permanently fixed spatial relationship of a plurality of possible spatial relationships, the first spatial relationship defining a gap between a first edge of the first panel and a second edge of the second panel, the first edge adjacent the second edge, the rigid connector coupled to the first edge and the second edge, the first panel immovable relative to the second panel when secured by the rigid connector, the first spatial relationship to cause the robot to have a first appearance that is visually distinguishable by a human from a second appearance of a second robot, the second appearance caused by the second robot being constructed with third and fourth panels secured in the second spatial relationship, the third and fourth panels having a same shape as the first and second panels;

a first leg having a first segment; and a second leg having a second segment, the first segment and the second segment corresponding to a same portion of the first and second legs, the second segment being shorter than the first segment to cause the robot to exhibit at least one of a humanly recognizable stance, a humanly recognizable posture, or a humanly recognizable gait.

14. A robot having an individualized appearance that is visually perceptible to a human, the robot comprising:
  at least one processor;
  a motor; and
  a housing including:
    a first structural component;
    a second structural component separate from the first structural component, the first and second structural components corresponding to first and second panels defining a shape of an outer surface of the housing, the first panel having a first perimeter with a first edge, the second panel having a second perimeter with a second edge;
    a first rigid connector to couple the first and second panels; and
    a second rigid connector to couple the first and second panels with the first edge adjacent the second edge in a spatial relationship of a plurality of possible spatial relationships for the first and second edges to affect the individualized appearance of the robot, wherein the shape of the outer surface of the housing is unchanging once the first rigid connector and the second rigid connector are coupled to the first and second panels, both the first and second rigid connectors to extend between the first edge of the first panel and the second edge of the second panel, the first rigid connector to be spaced apart from the second rigid connector, the first edge having an angular displacement relative to the second edge in the spatial relationship such that a first distance between a first end of the first edge and a first end of the second edge is less than a second distance between a second end of the first edge and a second end of the second edge, at least one of the first distance or the second distance being smaller than a length of the first edge.

15. The robot as defined in claim 14, wherein the spatial relationship causes the robot to resemble a second robot.

16. The robot as defined in claim 14, further including an eye assembly having an image sensor, the image sensor being selectively moveable relative to the housing.

17. The robot as defined in claim 14, further including a nose assembly carried by the housing in one of a first position or a second position, the robot appearing to have a longer nose when the nose assembly is in the first position than when the nose assembly is in the second position.

18. The robot as defined in claim 14, further including a mouth assembly having an upper portion and a lower portion, at least one of the upper portion or the lower portion being vertically moveable relative to the housing.

19. The robot as defined in claim 14, wherein the robot is a humanoid robot.

20. The robot as defined in claim 19, further including:
  a first leg having a first segment; and
  a second leg having a second segment, the first segment and the second segment corresponding to a same portion of the first and second legs, the second segment being shorter than the first segment.

21. The robot as defined in claim 14, further including a filler to fill in a gap between the first and second edges of the first and second panels.

22. A system comprising:
  a first component positioner to move a first panel to a first position for assembly of a first robot and to move the first panel to a second position for assembly of a second robot, the first position corresponding to a first spatial relationship with a second panel, the second position corresponding to a second spatial relationship with the second panel, the second spatial relationship different from the first spatial relationship;
  a second component positioner to move the second panel to a third position for assembly of the first robot and to move the second panel to a fourth position for assembly of the second robot, the third position corresponding to the first spatial relationship, the fourth position corresponding to the second spatial relationship, the first panel corresponding to a first region of a framework of either the first robot or the second robot, and the second panel corresponding to a second region of the framework, the first spatial relationship to define a first relative position of a first edge of the first panel to a second edge of the second panel, the second spatial relationship to define a second relative position of the first edge of the first panel to the second edge of the second panel, the second relative position different than from the first relative position; and
  a connector applicator to add a connector to fixedly attach the first panel to the second panel in the first spatial relationship for assembly of the first robot and to add a connector to fixedly attach the first panel to the second panel in the second spatial relationship for assembly of the second robot, each of the connector, the first panel, and the second panel to be immovable relative to one another when attached together, an appearance of the first robot having a humanly perceptible difference from an appearance of the second robot.

23. The system as defined in claim 22, wherein at least one of the first component positioner, the second component positioner, or the connector applicator includes a robotic manipulator arm.

24. The system as defined in claim 22, further including a robot assembly controller to select the first spatial relationship based on a random or pseudo-random number.

25. The system as defined in claim 22, wherein the first and second spatial relationships are limited to a first range of variability in a visible feature of the first and second robots.

26. The system as defined in claim 25, wherein the first range of variability is based on a second range of variability of an anatomical feature observable in humans.

27. The system as defined in claim 25, wherein the first spatial relationship is limited to a portion of the first range of variability associated with the second robot to create an impression of an inherited feature.

28. The system as defined in claim 22, further including a gap filler applicator to:
  dispense a filler into a first gap between the first and second edges when the first and second panels are connected in the first spatial relationship; and
  dispense the filler into a second gap between the first and second edges when the first and second panels are connected in the second spatial relationship.

* * * * *